(12) United States Patent
Pregitzer et al.

(10) Patent No.: US 9,484,814 B2
(45) Date of Patent: Nov. 1, 2016

(54) POWER CONVERTER CONTROLLER WITH ANALOG CONTROLLED VARIABLE CURRENT CIRCUIT

(71) Applicant: Power Integrations, Inc., San Jose, CA (US)

(72) Inventors: Ricardo Luis Janezic Pregitzer, Campbell, CA (US); Mingming Mao, Saratoga, CA (US); Tiziano Pastore, Los Gatos, CA (US); Michael Yue Zhang, Mountain View, CA (US); Yury Gaknoki, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 108 days.

(21) Appl. No.: 14/678,799

(22) Filed: Apr. 3, 2015

(65) Prior Publication Data

US 2016/0134187 A1 May 12, 2016

Related U.S. Application Data

(60) Provisional application No. 62/077,069, filed on Nov. 7, 2014.

(51) Int. Cl.
*H02M 3/156* (2006.01)
*H05B 39/04* (2006.01)
*H02M 1/00* (2006.01)
*H05B 33/08* (2006.01)

(52) U.S. Cl.
CPC ........... *H02M 3/156* (2013.01); *H05B 39/044* (2013.01); *H02M 2001/0009* (2013.01); *H02M 2001/0025* (2013.01); *H05B 33/0815* (2013.01)

(58) Field of Classification Search
CPC ............ H05B 33/0815; H05B 33/089; H05B 33/0845; H05B 33/0836; H05B 33/0824; H05B 39/04; H02M 3/156; H02M 3/157; H02M 3/158
USPC .................. 323/282–285; 315/192, 291, 294
See application file for complete search history.

(56) References Cited

U.S. PATENT DOCUMENTS 8,199,538 B2 6/2012 Piper
9,215,772 B2* 12/2015 Sood ........................ H02M 7/04
9,332,614 B2* 5/2016 Vaughan .............. H05B 33/089

(Continued)

FOREIGN PATENT DOCUMENTS

EP 2544512 A1 1/2013
GB 2460272 A 11/2009

(Continued)

OTHER PUBLICATIONS

European Patent Application No. 15193244.9—Extended European Search Report, dated May 3, 2016, 8 pages.

*Primary Examiner* — Adolf Berhane
(74) *Attorney, Agent, or Firm* — Blakely Sokoloff Taylor & Zafman LLP

(57) ABSTRACT

A bleeder controller for controlling a magnitude of a variable current conducted by bleeder circuitry between input terminals of a device is disclosed. The magnitude of the variable current is controllable in response to a control signal. The bleeder controller includes a dimming detector to classify a half line cycle as leading-edge-dimmed or a trailing-edge-dimmed in response to at least one of an input current sense signal and an input voltage sense signal.

21 Claims, 11 Drawing Sheets

(56) References Cited

U.S. PATENT DOCUMENTS

| | | | |
|---|---|---|---|
| 9,408,261 B2* | 8/2016 | Angeles | H05B 33/0815 |
| 2007/0279820 A1* | 12/2007 | Fang | H02H 7/1203 |
| | | | 361/97 |
| 2011/0291583 A1 | 12/2011 | Shen | |
| 2012/0319610 A1* | 12/2012 | Yoshinaga | H05B 33/0848 |
| | | | 315/210 |
| 2013/0154495 A1* | 6/2013 | He | H02M 1/44 |
| | | | 315/210 |
| 2016/0081151 A1* | 3/2016 | Wang | H05B 33/0815 |
| | | | 315/186 |
| 2016/0095174 A1* | 3/2016 | Vaughan | H05B 33/089 |
| | | | 315/200 R |
| 2016/0134189 A1* | 5/2016 | Pregitzer | H02M 3/157 |
| | | | 323/283 |

FOREIGN PATENT DOCUMENTS

| | | |
|---|---|---|
| WO | WO 2012/007798 A2 | 1/2012 |
| WO | WO 2014/072847 A1 | 5/2014 |

* cited by examiner

| Event Type | Input Control Circuit Response/Output |
|---|---|
| Dimming is detected but type of dimmer is not discerned | For N half-line cycles (during a bleeder enable window): While $V_{RCT}<V_{TH}$, drive variable current circuit with a fixed lower current. While $V_{RCT}>=V_{TH}$, maintain the minimum value of $I_{RCT}$ at low reference $RF_L$. |
| Trailing edge dimmer is detected | As long as controller is on: While $V_{RCT}<V_{TH}$, drive variable current circuit with the lower current. While $V_{RCT}>=V_{TH}$, maintain the minimum value of $I_{RCT}$ at low reference $RF_L$. |
| Deep dimming is detected | Same as dimming. In deep dimming, controller prevents delivery of power to the output. |
| Leading edge dimmer is detected | Drive variable current circuit with higher current for a first period after leading edge is detected, then maintain the minimum value of $I_{RCT}$ at high reference $RF_H$ for a second period, then maintain the minimum value of $I_{RCT}$ at low reference $RF_L$ while $V_{RCT}>=V_{TH}$. If a leading edge was detected within at least one of (N-1) half-line cycles prior to the presently occurring half-line cycle, then start driving variable current circuit with a fixed higher current as soon as $V_{RCT}$ reaches $V_{TH}$. |

FIG. 5

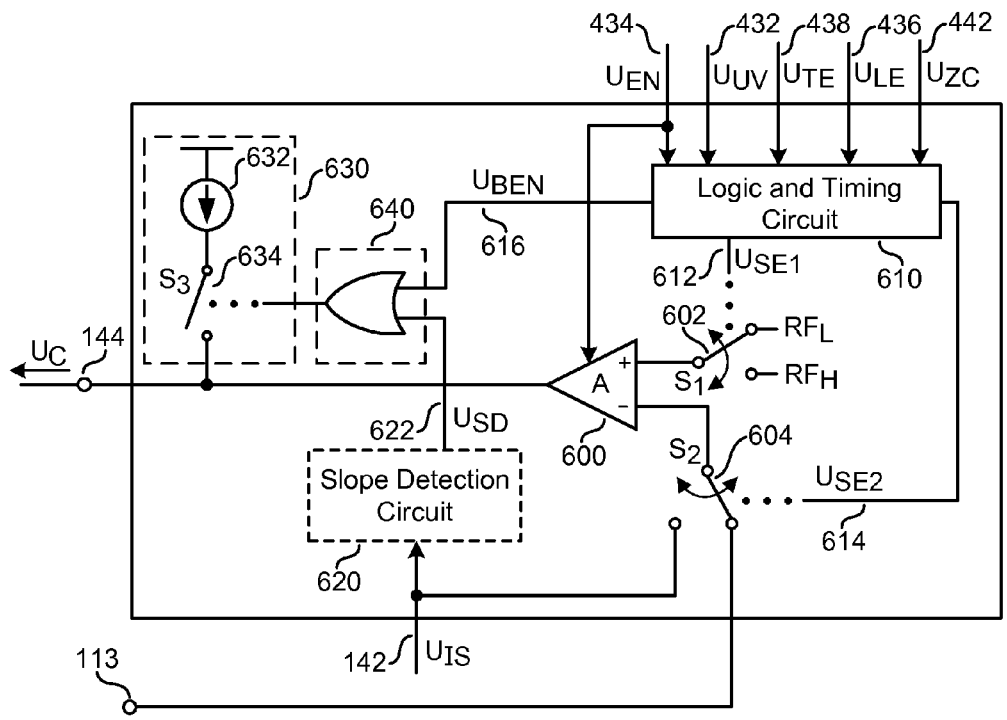

FIG. 6

POWER CONVERTER CONTROLLER WITH ANALOG CONTROLLED VARIABLE CURRENT CIRCUIT

CROSS-REFERENCE TO RELATED APPLICATION

This application claims priority under the provisions of 35 U.S.C. §119(e) to U.S. Provisional Application No. 62/077,069, filed Nov. 7, 2014. U.S. Provisional Application No. 62/077,069 is hereby incorporated by reference.

FIELD OF DISCLOSURE

The present disclosure relates generally to a power conversion system and, more specifically, to a variable current circuit that can be used in a power conversion system having a dimmer.

BACKGROUND

Many electronic devices, such as cell phones, laptop computers, etc., use direct current (dc) power to operate. Conventional wall outlets generally deliver a high-voltage alternating current (ac) power that needs to be transformed to dc power in order to be used as a power source by most electronic devices. In a switch mode power converter, also referred to as a switch mode power supply, a switch is used to provide a desired dc power by either switching at a variable duty ratio (typically the ratio of on-time of the switch to total switching period) or by varying the number of ON and OFF cycles per unit time. A switch mode power converter may also employ a controller to provide output regulation by sensing the output and controlling the switch of the power converter in a closed loop. Switch mode power converters are commonly used due to their high efficiency, small size, and the safety and protection features that are provided.

Switch mode power converters have recently found wide use in applications involving high-efficiency light sources. Example applications include electronic ballasts for fluorescent or other discharge lamps, light-emitting diode (LED) drivers (e.g., power conversion systems that provide regulated power to LED lamps), etc. LEDs have become popular due to their longer life and their recent performance improvement in light spectrum (e.g., color), and Lumens per Watt delivery. As such, LED drivers that include switch mode power converters, which may also be referred to as off-line LED drivers, have recently received considerable attention in the lighting industry.

Some lighting applications include a feature that allows the user to control the brightness of a lighting device. Specifically, in lighting applications, reducing the brightness of the lighting device may be referred to as dimming and may be accomplished by limiting the power supplied to the lighting device. In one example, dimming can be realized by implementing phase dimming, where a portion of the ac input voltage, also referred to as an ac line signal, is blocked from being received by the lighting device. This reduces the amount of power delivered to the lighting device, thereby reducing the brightness of the device. In phase dimming, the portion of the input voltage that is blocked can be measured by a phase angle that represents a portion of a period of the input voltage measured in degrees. One period may be defined as one complete line cycle and may correspond to 360 degrees. Similarly, half of the period of the input voltage may be referred to as a half line cycle and may correspond to 180 degrees.

One device that may be used to implement phase dimming in a lighting system is a triac dimmer. Specifically, a triac may act as a switch and be used to block the input voltage from the input of the power converter for a portion of the half line cycle. In operation, when the triac is disengaged (turned off), the ac line signal is blocked from the input of the power converter and the current to the power converter is substantially restricted. Conversely, when the triac is engaged (turned on), the ac line signal is unblocked from the input of the power converter and the current is permitted to conduct to the power converter. The triac may remain engaged and continue to conduct current until the current in the triac drops below a threshold value commonly known as a holding current.

Implementing phase dimming in an off-line LED driver with a triac dimmer may prove challenging for several reasons, with the triac itself being one of them. For example, when the triac fires (e.g., turns on) during each half cycle of the input voltage, the current through the triac suddenly increases (typically, in the form of a spike). This spike may lead to ringing in the triac current due to parasitic capacitances and inductances around the triac, ultimately causing the triac to misfire. Specifically, because of the ringing, the triac may conduct insufficient current to remain engaged and may prematurely turn off. Triac misfires usually happen at different times in consecutive input voltage cycles and, as such, energy delivered to the LED lamp varies from one cycle to another. This may result in a perceivable fluctuation of light output by the LED lamp (e.g., flickering in the LED lamp).

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 shows a table that includes a list of events detected by the controller of FIG. 4 and the corresponding response of the input control circuit of the controller, in accordance with an example of the disclosure.

FIG. 6 is a functional block diagram of an example input control circuit, in accordance with an example of the disclosure.

DETAILED DESCRIPTION

Various examples are described below relating to a variable current circuit and a controller that can be used in a power conversion system having a leading edge dimmer (e.g., a triac) or a trailing edge dimmer. In one example, the power conversion system may be used in an off-line LED driver.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "an example" means that a particular feature, structure, or characteristic described in connection with the example is included in at least one example of the present invention. Thus, the appearances of the phrases "in one example" or "in an example" in various places throughout this specification are not necessarily all referring to the same examples. Furthermore, the particular features, structures, or characteristics may be combined in any suitable manner in one or more examples.

Figure 1:
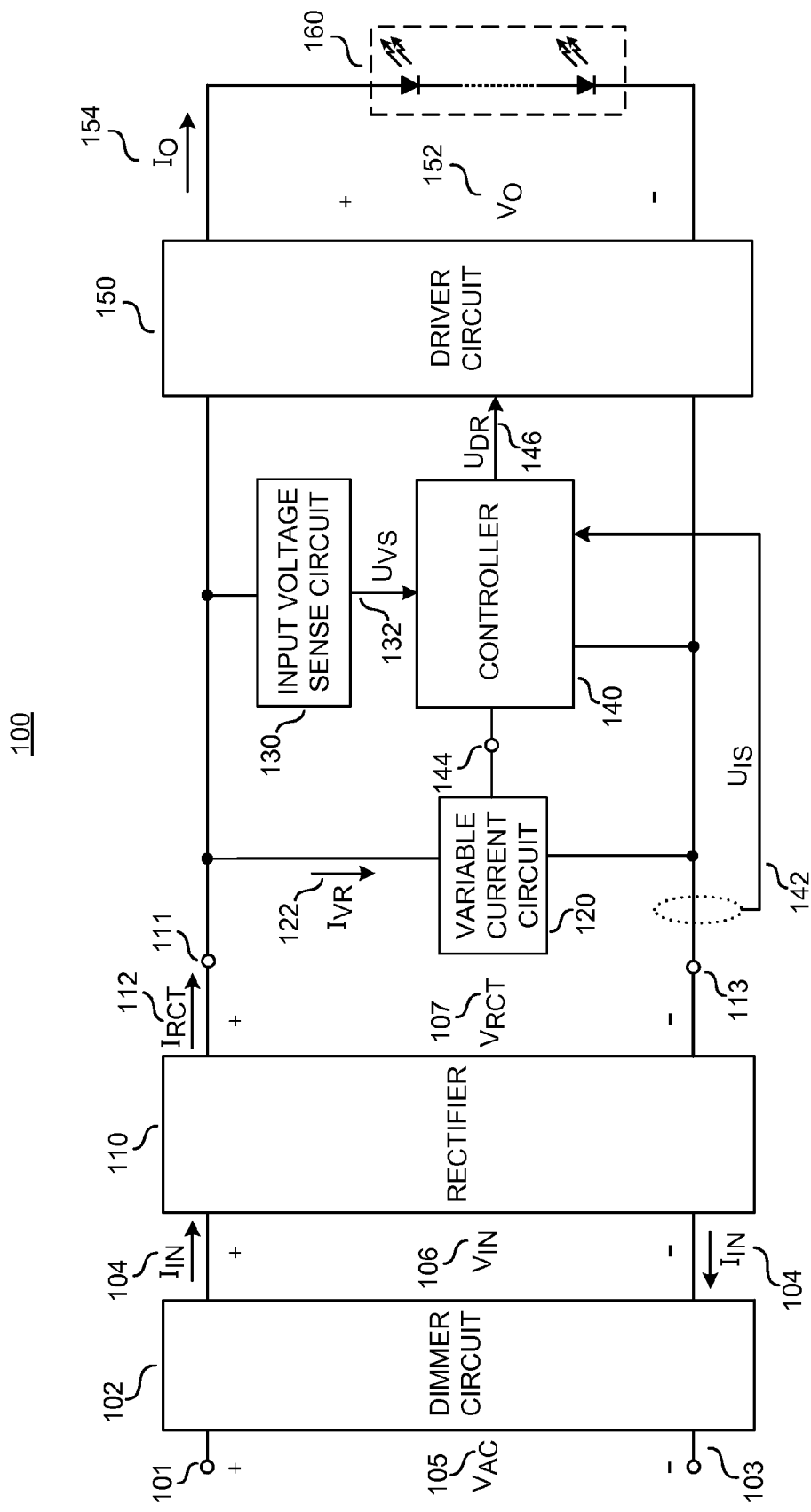
FIG. 1 is a functional block diagram of an example power conversion system including a controller and a variable current circuit, in accordance with an example of the disclosure.

FIG. 1 illustrates a functional block diagram of an example power conversion system 100 including a variable current circuit and a controller. The illustrated power conversion system 100 may generally include a dimmer circuit 102, a rectifier 110, a variable current circuit 120, a controller 140, a driver circuit 150, and a load 160. Circuit 120 may be referred to as either a variable current circuit or a bleeder circuit throughout this disclosure.

Power conversion system 100 may provide output power to load 160 from an unregulated ac line voltage $V_{AC}$ 105, also referred to as a line signal. In the illustrated example, line voltage $V_{AC}$ 105 includes a periodic ac line voltage applied between terminals 101 and 103. As shown, dimmer circuit 102 may be coupled to receive line voltage $V_{AC}$ 105 and generate an input current $I_{IN}$ 104 and an input voltage $V_{IN}$ 106 at its output. In one example, dimmer circuit 102 may include a dimmer that blocks line voltage $V_{AC}$ 105 from the input of driver circuit 150 for a portion of the beginning of each half line cycle. However, it is appreciated that either a trailing edge or leading edge dimmer may be used in dimmer circuit 102 to block a portion of line voltage $V_{AC}$ 105 from the input of driver circuit 150. Accordingly, input voltage $V_{IN}$ 106 may also be referred to as a truncated line voltage. In operation, dimmer circuit 102 may limit the amount of power delivered to driver circuit 150, thereby lowering the current delivered to load 160. Thus, when load 160 includes an array of LEDs, dimmer circuit 102 may be used to reduce the total light output by the array of LEDs.

In some examples, dimmer circuit 102 may include a triac dimmer. In these examples, input voltage $V_{IN}$ 106 may represent the output voltage of the triac and input current $I_{IN}$ 104 may represent the current in the triac (e.g., the triac current). The triac may include a semiconductor component that behaves as a switch used to block a portion of the line voltage from the input of driver circuit 150. In operation, when the triac is disengaged (turned off), line voltage $V_{AC}$ 105 is blocked from the input of driver circuit 150 and current to driver circuit 150 is substantially restricted. Conversely, when the triac is engaged (turned on), line voltage $V_{AC}$ 105 is unblocked from the input of driver circuit 150 and current is permitted to conduct to driver circuit 150.

In other examples, dimmer circuit 102 may include one of many known semiconductor switches, such as a metal oxide semiconductor field effect transistor (MOSFET). In these examples, dimmer circuit 102 may switch off (e.g., the switch may transition to the OFF state) and block line voltage $V_{AC}$ 105 from driver circuit 150 for a portion of the beginning of each half line cycle. After a certain amount of time, dimmer circuit 102 may switch on (e.g., the switch may transition to the ON state) and unblock line voltage $V_{AC}$ 105 from driver circuit 150.

In general, the portion of line voltage $V_{AC}$ 105 that is blocked from driver circuit 150 may be related to the amount of dimming desired. For example, the larger the blocked portion of the line voltage, the more pronounced the dimming effect. In lighting applications that use a triac to reduce the total light output, the triac may require at least a first amount of current, also referred to as a latching current, for a threshold period of time, may also referred to as a latching period, after turning on and at least a second amount of current, also referred to as a holding current, for the remainder of the half line cycle to remain engaged. Power conversion system 100 may use variable current circuit 120 in conjunction with controller 140 to ensure that the triac current does not drop below the latching current for the latching period after the triac turns on and the holding current for the remainder of the half line cycle.

As further shown in FIG. 1, dimmer circuit 102 may be coupled to rectifier 110, which, in one example, may include a full bridge rectifier. However, it should be appreciated that other known rectifier circuits may be used. Rectifier 110 may be coupled to receive input voltage $V_{IN}$ 106 and input current $I_{IN}$ 104. In response, rectifier 110 may generate rectified voltage $V_{RCT}$ 107 between its output terminals 111 and 113 and may output rectified current $I_{RCT}$ 112 to output terminals 111 and 113. In other words, rectified voltage $V_{RCT}$ 107 may correspond to the rectified version of input voltage $V_{IN}$ 106 and rectified current $I_{RCT}$ 112 may correspond to the rectified version of input current $I_{IN}$ 104. In the illustrated example, terminal 113 may also be referred to as a ground reference. In power conversion system 100, driver circuit 150 may produce an output voltage $V_{OUT}$ 152 and output current $I_{OUT}$ 154 across load 160. Driver circuit 150 may include a switch mode power converter. In one example, driver circuit 150 includes a flyback power converter. It should be noted that other converter topologies such as buck converter, boost converter, buck-boost converter can also be used in driver circuit 150.

As further illustrated, variable current circuit 120 is coupled to the input of driver circuit 150 between terminals 111 and 113, and has an input coupled to an output terminal 144 of controller 140. In operation, variable current circuit 120 conducts a current $I_{VR}$ 122 between terminals 111 and 113 that is responsive to a signal received by the input of variable current circuit 120.

In the example power conversion system illustrated in FIG. 1, controller 140 is coupled to receive a voltage sense signal $U_{VS}$ 132 representative of rectified voltage $V_{RCT}$ 107 (hence, input voltage $V_{IN}$ 106) and receive a current sense signal $U_{IS}$ 142 representative of rectified current $I_{RCT}$ 112 (hence, input current $I_{IN}$ 104). In one example, power conversion system 100 may include an input voltage sense circuit 130 coupled to sense rectified voltage $V_{RCT}$ 107 and produce voltage sense signal $U_{VS}$ 132 in response to rectified voltage $V_{RCT}$ 107.

Any one of a variety of means to sense current, such as for example receiving the voltage across a resistor conducting the current, or for example receiving a scaled current from a current transformer, or for example receiving the voltage across the on-resistance of a metal oxide semiconductor field-effect transistor (MOSFET) that conducts the current, may be used to sense rectified current $I_{RCT}$ 112 and provide that as current sense signal $U_{IS}$ 142 to controller 140.

Controller 140 is further coupled to output a drive signal $U_{DR}$ 146 to driver circuit 150 to control the energy transfer from the input to the output of driver circuit 150, thereby regulating an output quantity (e.g., output voltage $V_{OUT}$ 152, output current $I_{OUT}$ 154, or the combination of the two) at a desired level. More specifically, controller 140 can control the energy transfer by driving a switch of driver circuit 150 with drive signal $U_{DR}$ 146. In operation, controller 140 can adjust drive signal $U_{DR}$ 146 in response to at least one of voltage sense signal $U_{VS}$ 132, current sense signal $U_{IS}$ 142, and a feedback signal (not shown) representative of the output quantity. For example, controller 140 can adjust drive signal $U_{DR}$ 146 to prevent the energy transfer from the input to the output of driver circuit 150 (e.g., by disabling the switching of the switch of driver circuit 150) when voltage sense signal $U_{VS}$ 132 indicates that the portion of the half-line cycle that line voltage $V_{AC}$ 105 is blocked by dimmer circuit 102 has reached a threshold amount (e.g., 90% of the half-line cycle). Furthermore, controller 140 can control the energy transfer from the input to the output of driver circuit 150 to provide power factor correction (PFC) such that rectified current $I_{RCT}$ 112 (hence, input current $I_{IN}$ 104) is in phase with and proportional to rectified voltage $V_{RCT}$ 107 (hence, input voltage $V_{IN}$ 106).

Additionally, controller 140 can adjust the signal that is output to output terminal 144 in response to at least one of current sense signal $U_{IS}$ 142 and voltage sense signal $U_{VS}$ 132 to vary the signal received by the input of bleeder circuit 120 and hence, vary current $I_{VR}$ 122. For example, by varying current $I_{VR}$ 122 in response to current sense signal $U_{IS}$ 142, controller 140 can control rectified current $I_{RCT}$ 112 to ensure that a sufficient latching current is drawn from dimmer circuit 102 for the latching period after dimmer circuit 102 turns on and a sufficient holding current is drawn from dimmer circuit 102 for the remainder of the half line cycle. This may prevent dimmer circuit 102 from turning off prematurely during a half line cycle and thus, help prevent the fluctuations in the light output.

Figure 2A:
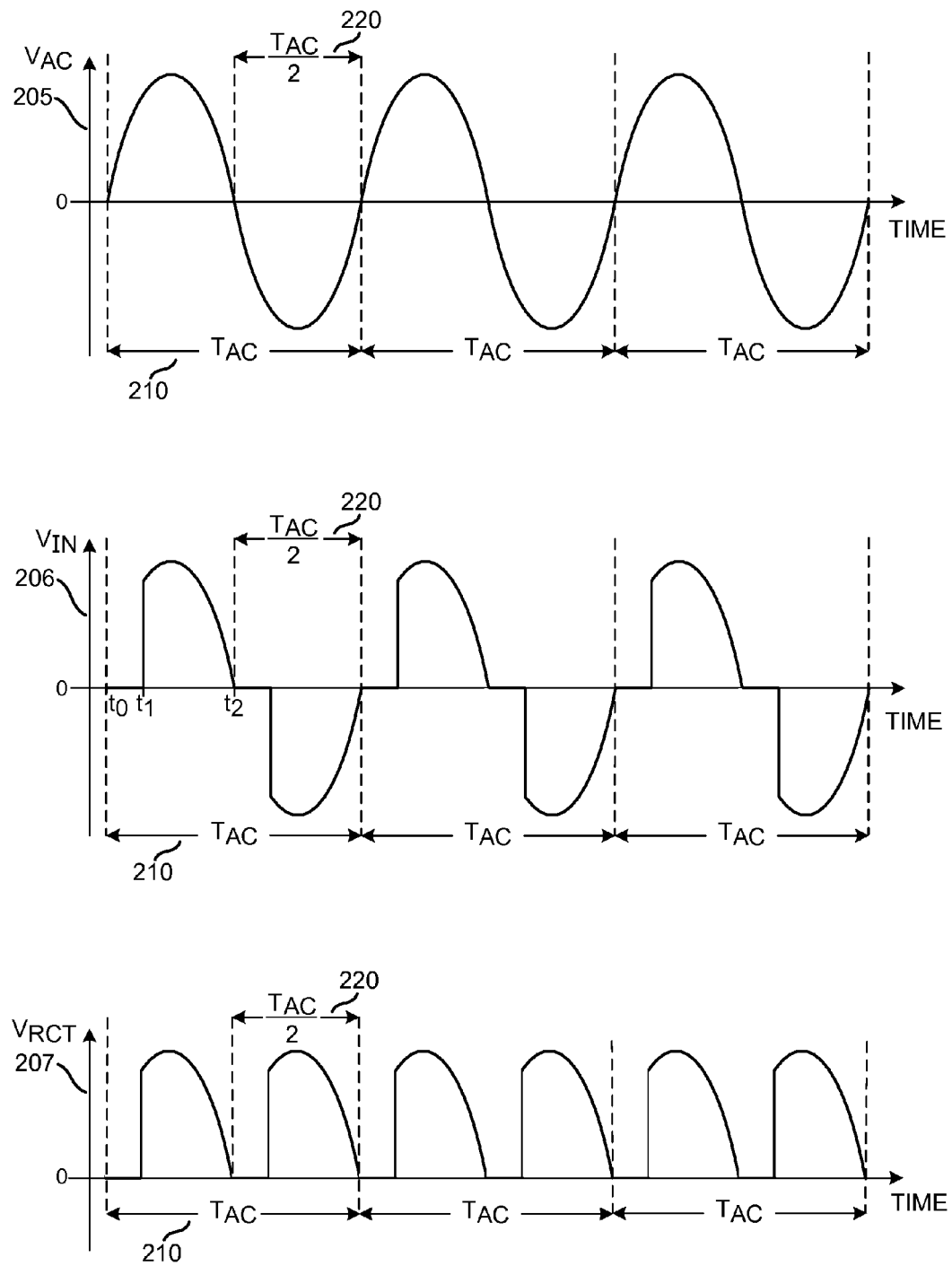
FIG. 2A illustrates example waveforms that correspond to various voltage signals of the example power conversion system of FIG. 1 when a leading edge dimmer is used to implement phase dimming, in accordance with an example of the disclosure.

FIG. 2A illustrates example waveforms that are associated with various voltage signals of power conversion system 100 when a leading edge dimmer is used to implement phase dimming. Waveform 205 is one example representation of line voltage $V_{AC}$ 105. As shown, waveform 205 is a sinusoidal waveform with a period $T_{AC}$ 210, which may also be referred to as a full line cycle. Similarly, half of period $T_{AC}$ 210 ($T_{AC}/2$ 220) may be referred to as a half line cycle. Waveform 206 is one possible representation of input voltage $V_{IN}$ 106 that may correspond to the output voltage of dimmer circuit 102. As previously noted, dimmer circuit 102 may block line voltage $V_{AC}$ 105 from driver circuit 150 for a portion of the beginning of the half line cycle to limit the amount of power delivered to load 160. For example, in the half line cycle between time to and time $t_2$, waveform 206 is substantially zero volts between time to and time $t_1$ due to dimmer circuit 102 blocking line voltage $V_{AC}$ 105. For the remaining portion of the half line cycle (between time $t_1$ and time $t_2$), dimmer circuit 102 unblocks line voltage $V_{AC}$ 105 and, as shown, waveform 206 substantially follows waveform 205. Waveform 207 is one possible representation of rectified voltage $V_{RCT}$ 107 generated by rectifier 110. As depicted, waveform 207 is similar to waveform 206 except that portions of waveform 206 that are below zero volts (e.g., negative) are rectified to positive voltages of equal magnitude. In other words, $V_{RCT}=|V_{IN}|$.

Figure 2B:
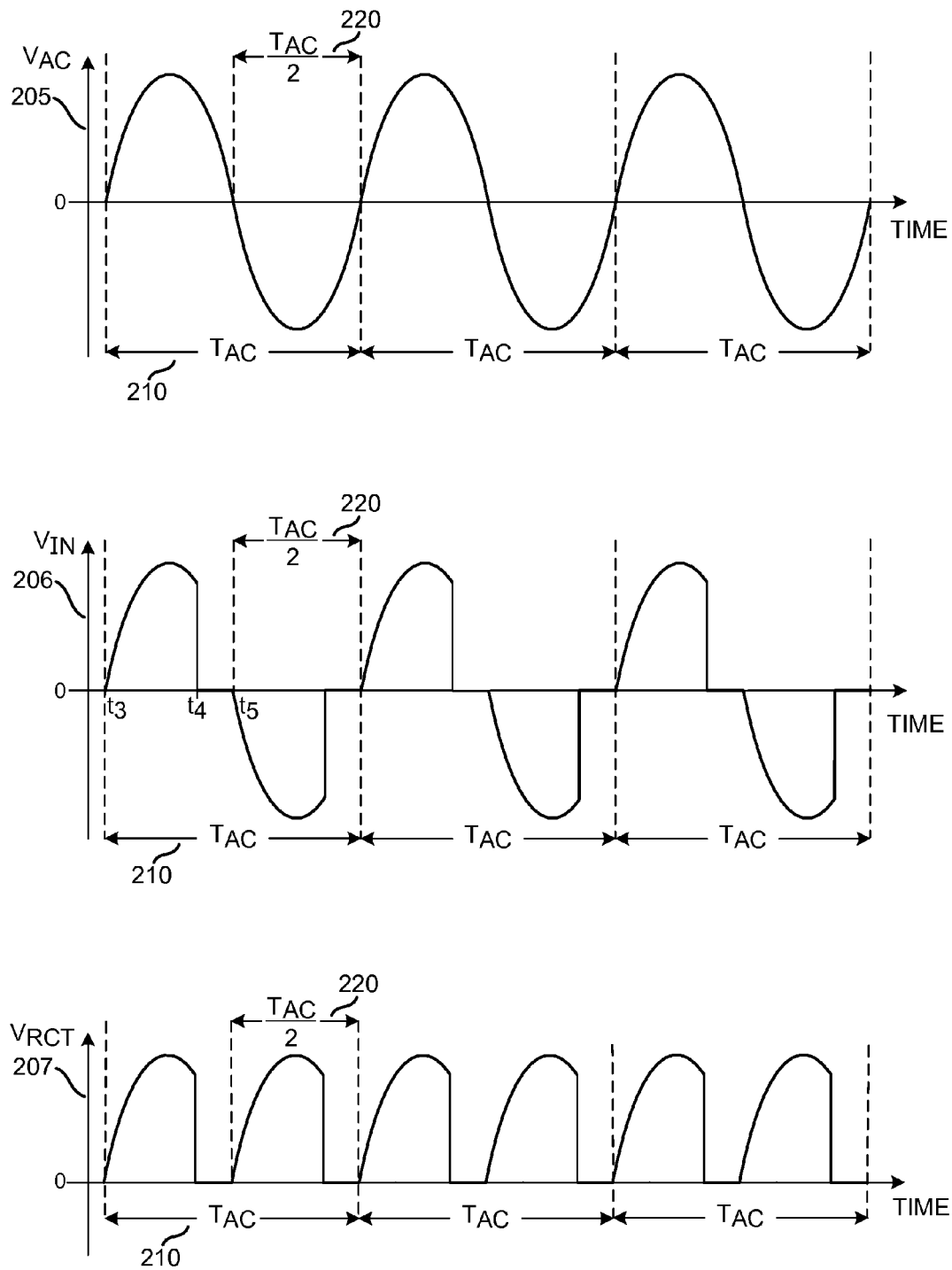
FIG. 2B illustrates example waveforms that correspond to various voltage signals of the example power conversion system of FIG. 1 when a trailing dimmer is used to implement phase dimming, in accordance with an example of the disclosure.

FIG. 2B illustrates example waveforms that are associated with various voltage signals of power conversion system 100 when a trailing edge dimmer is used in dimmer circuit 102. Waveform 205, period $T_{AC}$ 210, and half line cycle $T_{AC}/2$ 220 in FIG. 2B are same as those that are shown in FIG. 2A. Similar to waveforms 206 and 207 in FIG. 2A, waveforms 206 and 207 in FIG. 2B are representative of input voltage $V_{IN}$ 106 and rectified voltage $V_{RCT}$ 107, respectively. However, waveforms 206 and 207 in FIG. 2B are different from those that are illustrated in FIG. 2A because when a trailing edge dimmer is used to limit the amount of power delivered to load 160, dimmer circuit 102 typically blocks line voltage $V_{AC}$ 105 from driver circuit 150 for a portion of the end of the half line cycle instead of a portion of the beginning of the half line cycle. For example, in the half line cycle between time $t_3$ and time $t_5$, waveform 206 is substantially zero volts between time $t_4$ and time $t_5$ due to dimmer circuit 102 blocking line voltage $V_{AC}$ 105. Between time $t_3$ and time $t_4$, dimmer circuit 102 does not block line voltage $V_{AC}$ 105 and, as shown, waveform 206 substantially follows waveform 205.

Figure 3A:
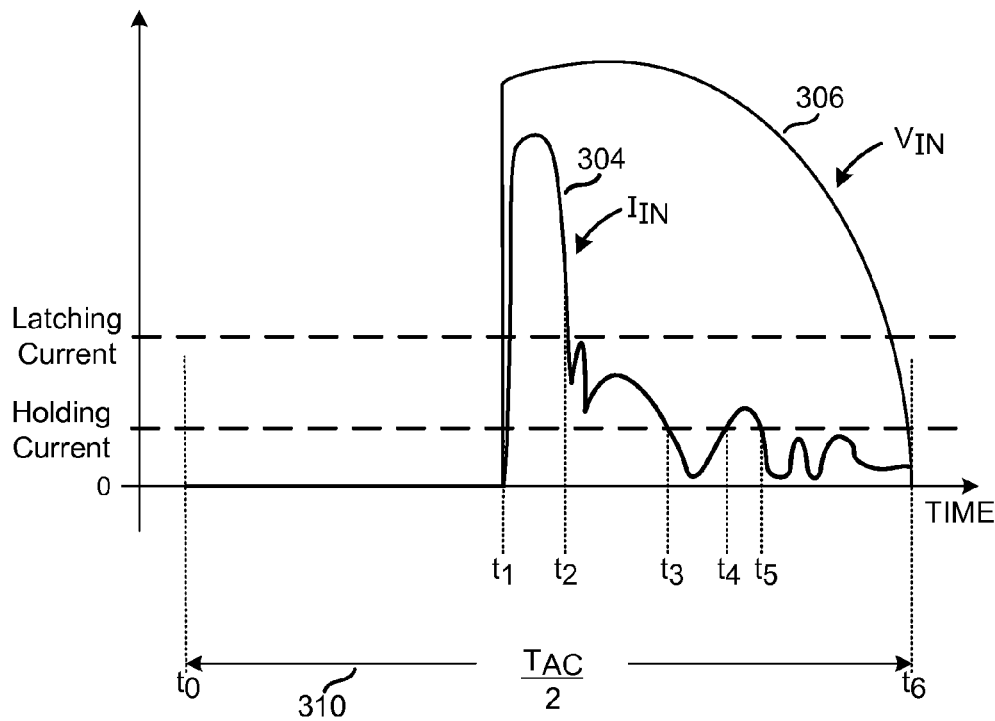
FIG. 3A shows one example set of waveforms that correspond to the voltage and current signals at the output of a dimmer circuit including a leading edge dimmer that can be used in the example power conversion system of FIG. 1, in accordance with an example of the disclosure.

FIG. 3A shows one example set of waveforms for voltage and current signals at the output of a dimmer circuit including a leading edge dimmer that can be used in power conversion system 100. In one example, the leading edge dimmer may be a triac and these waveforms may be representative of the voltage and current signals at the output of the triac when bleeder circuit 120 is not included in power conversion system 100 or not configured to be operative. Waveform 306 corresponds to one example representation of input voltage $V_{IN}$ 106 for one half line cycle, and waveform 304 corresponds to one example representation of input current $I_{IN}$ 104 (i.e., the triac current) for one half line cycle. Period 310 is representative of one half line cycle ($T_{AC}/2$). As shown, the triac is switched off (i.e., disengaged) and not conducting current at the beginning of period 310 between time to and time $t_1$. Thus, waveform 306 is substantially zero volts between time to and time $t_1$ as the triac blocks line voltage $V_{AC}$ 105. At time $t_1$, the triac is switched on (e.g., engaged) and starts conducting current. The triac current stays above the latching current until time $t_2$ as shown by waveform 304. In the depicted example, the time period between time $t_1$ and time $t_2$ indicates the latching period. Since the triac current is above the latching current for the latching period, the triac is engaged during this period. The triac may remain engaged until time $t_6$ (the end of the half line cycle) as long as the triac current stays above the holding current. As such, in an ideal case with the triac remaining on throughout the time period between time $t_1$ and time $t_6$, waveform 306 substantially follows line voltage $V_{AC}$ 105 as shown in FIG. 3A. However, as previously mentioned, when the triac switches on, waveform 304 may suddenly rise from zero, causing ringing in the triac current. Without bleeder circuit 120 conducting current between terminals 111 and 113, the resulting ringing may cause the triac current to drop below the holding current and turn off the triac (which may then cause input voltage $V_{IN}$ 106 represented by waveform 306 to drop to zero volts). As a result, driver circuit 150 may deliver less than the desired amount of power to load 160 and the light output by load 160 may fluctuate. In the illustrated example of FIG. 3A, waveform 304 is above the holding current between time $t_2$ and time $t_3$ during which the triac is on and conducting current and during which waveform 306 follows line voltage $V_{AC}$ 105. Between time $t_3$ and time $t_4$ input current $I_{IN}$ 104 represented by waveform 304 goes below the holding current and in turn, can cause the triac to turn off and waveform 306 to drop to zero volts (not shown). If this happens, the triac may not turn on even if waveform 304 goes above the holding current again such as between time t4 and time t5.

Figure 3B:
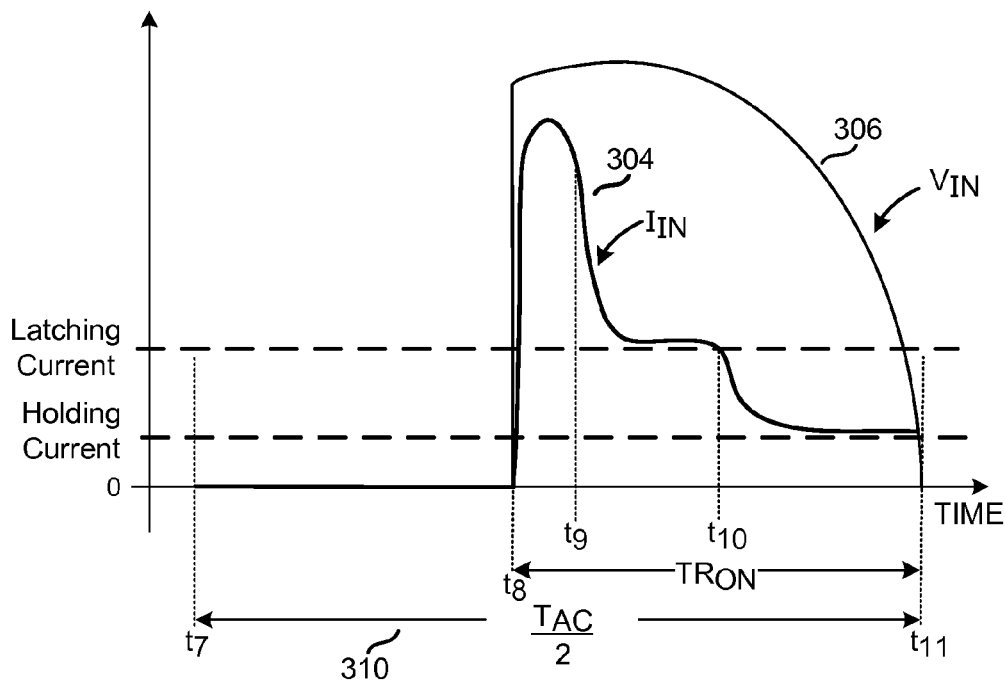
FIG. 3B shows another example set of waveforms that correspond to the voltage and current signals at the output of a dimmer circuit including a leading edge dimmer that can be used in the example power conversion system of FIG. 1, in accordance with an example of the disclosure.

FIG. 3B shows another example set of waveforms for voltage and current signals at the output of the dimmer circuit including a leading edge dimmer that can be used in power conversion system 100. Waveforms 304 and 306 in FIG. 3B are similar to those illustrated in FIG. 3A, except that these waveforms are representative of the voltage and current signals at the output of the triac when bleeder circuit 120 is operating in conjunction with controller 140 to control the triac current. As shown, with controller 140 adjusting the signal that is output to output terminal 144 to vary the current conducted by bleeder circuit 120 in order to control the triac current, the ringing in the triac current is largely eliminated. Moreover, the minimum value of the triac current is kept at a level above the latching current for a certain period time (until time $t_{10}$) after the triac turns on. Generally, the amount of time that it takes for the triac current to drop to the latching current varies based on the input impedance of driver circuit 150. If the triac current drops below the latching current before the latching period is over, the triac may turn off. By keeping the minimum value of the triac current at a level above the latching current for a certain period of time (that is at least as long as the latching period) after the triac turns on, controller 140 can ensure that the triac remains on throughout the latching period. As further illustrated, waveform 304 starts to drop at time $t_{10}$ but eventually settles at a level above the holding current and remains at that level until time $t_{11}$. That is, the triac current remains above the holding current after the latching period until the end of period 310. As a result, the triac remains on and conducts current, causing waveform 306 to follow line voltage $V_{AC}$ 105 for the remainder of period 310 (i.e., between time $t_{10}$ and time $t_{11}$). This may reduce the fluctuations in the power delivered by driver circuit 150 to load 160 and thus, help power conversion system 100 maintain a steady light output during dimming.

Figure 3C:
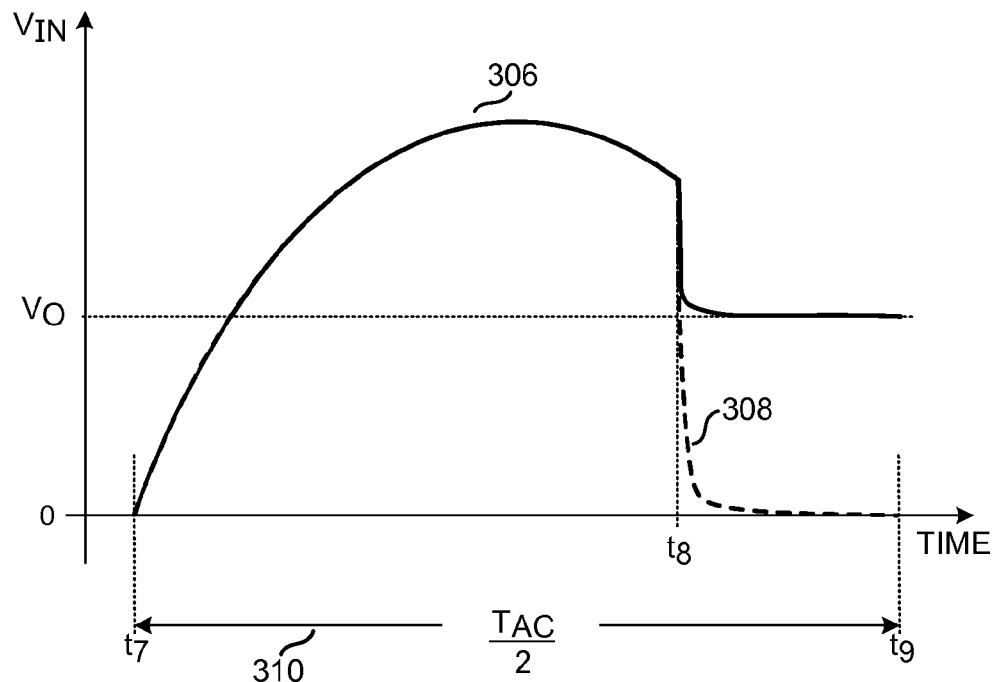
FIG. 3C shows an example waveform that corresponds to the voltage signal at the output of a dimmer circuit including a trailing edge dimmer that can be used in the example power conversion system of FIG. 1, in accordance with an example of the disclosure.

FIG. 3C shows an example waveform for voltage signal at the output of a dimmer circuit including a trailing edge dimmer that can be used in power conversion system 100. In the illustrated example, waveform 306 is representative of the voltage signal at the output of dimmer circuit 102 when bleeder circuit 120 is not included in power conversion system 100 or not configured to conduct current. Period 310 is representative of one half line cycle ($T_{AC}/2$). Voltage level $V_O$ represents the output voltage of driver circuit 150. As shown, dimmer circuit 102 is engaged and conducting current at the beginning of period 310 between time $t_7$ and time $t_8$. Therefore, waveform 306 substantially follows line voltage $V_{AC}$ 105. Between time $t_8$ and time $t_9$, dimmer circuit 102 is disengaged and blocks line voltage $V_{AC}$ 105 from driver circuit 150. Ideally, input voltage $V_{IN}$ 106 should drop to zero volts and stay at that level until time $t_9$ as shown by dashed lines 308. However, in some switch mode power converter topologies such as, for example, in a buck converter, the input voltage of the converter may not drop below the output voltage of the converter. As such, in some cases, without bleeder circuit 120 conducting current, waveform 306 may drop only to voltage level $V_O$ instead of zero volts when dimmer circuit 102 is disengaged. This may prevent the trailing edge dimmer from detecting the zero crossings of input voltage $V_{IN}$ 106 and thus, cause the trailing edge dimmer to malfunction.

Figure 3D:
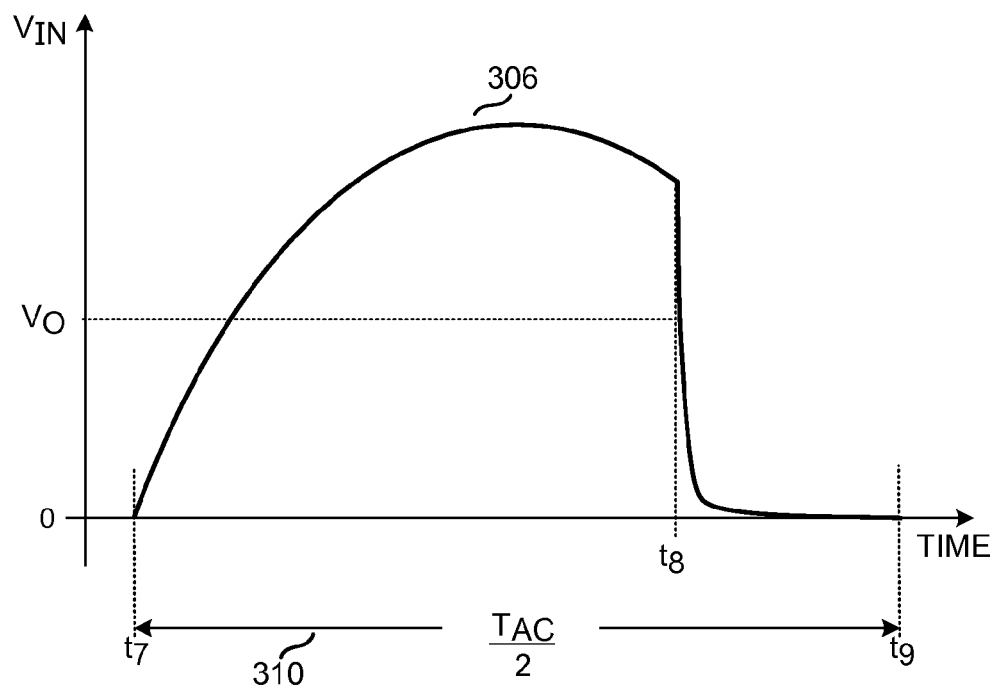
FIG. 3D shows another example waveform that corresponds to the voltage signal at the output of a dimmer circuit including a trailing edge dimmer that can be used in the example power conversion system of FIG. 1, in accordance with an example of the disclosure.

FIG. 3D shows another example waveform for voltage signal at the output of a dimmer circuit including a trailing edge dimmer that can be used in power conversion system 100. In the illustrated example, waveform 306 is representative of the voltage signal at the output of dimmer circuit 102 when bleeder circuit 120 is configured to conduct current. As shown, waveform 306 in FIG. 3D is similar to waveform 306 in FIG. 3C except for the time period between time t8 and time t9 during which dimmer circuit 102 is disengaged. Because bleeder circuit 120 is configured to conduct current during this time period, input voltage $V_{IN}$ 106 can drop to zero volts and stay at that level until time t9. This may help the trailing edge dimmer detect the zero crossings of input voltage $V_{IN}$ 106 and operate reliably.

Figure 4:
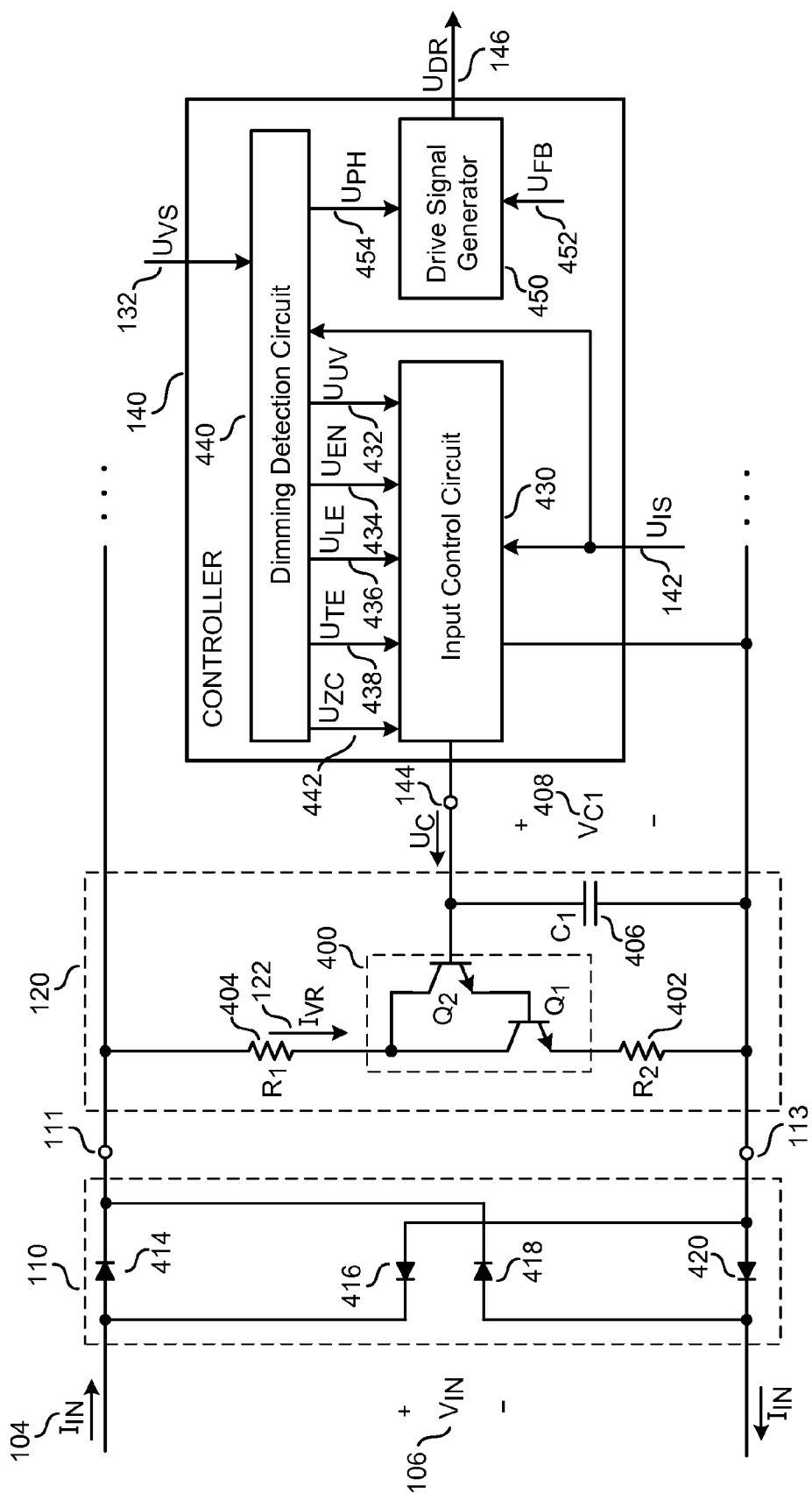
FIG. 4 illustrates a circuit diagram for an example variable current circuit and a functional block diagram for an example controller including an example input control circuit, in accordance with an example of the disclosure.

FIG. 4 illustrates an example circuit diagram for the variable current circuit of FIG. 1 and an example functional block diagram for the controller of FIG. 1. Variable current circuit 120 (bleeder circuit 120) includes an amplifying circuitry 400, resistors $R_1$ 404 and $R_2$ 402, and a capacitor $C_1$ 406. Capacitor $C_1$ 406 is coupled between the input of bleeder circuit 120 and terminal 113. Amplifying circuitry 400 is coupled to terminal 111 with resistor $R_1$ 404 and to terminal 113 with resistor $R_2$ 402. In the illustrated example, the signal received by the input of bleeder circuit 120, also referred to as a control signal $U_C$, represents a current that is output to output terminal 144 and the voltage between output terminal 144 and terminal 113 represents a voltage $V_{C1}$ 408 across capacitor $C_1$ 406. In one example, amplifying circuitry 400 includes a Darlington pair comprising NPN bipolar transistors $Q_1$ and $Q_2$ as illustrated. Darlington pair can also be implemented by using PNP bipolar transistors. Alternatively, amplifying circuitry 400 can include an amplifier, such as an operational amplifier, transconductance amplifier and/or comprise other transistors, such as MOSFETs, insulated gate bipolar transistors (IGBTs), or junction gate field-effect transistors (JFETs). In operation, when voltage $V_{C1}$ 408 is less than a turn-on threshold (i.e., the sum of the threshold voltages of transistors $Q_1$ and $Q_2$), amplifying circuitry 400 (hence, bleeder circuit 120) does not conduct current between terminals 111 and 113. When voltage $V_{C1}$ 408 is equal to or greater than the turn-on threshold, amplifying circuitry 400 can either act as a switch or a current amplifier.

In one example, transistors $Q_1$ and $Q_2$ can operate in either the active or saturation region. In a case where transistors $Q_1$ and $Q_2$ operate in the active region, amplifying circuitry 400 can act as a current amplifier and thus, conduct an amplified version of the control signal as current $I_{VR}$ 122 between terminals 111 and 113. That is, current $I_{VR}$ 122 is substantially equal to the control signal $U_C$ multiplied by the gain of amplifying circuitry 400. The gain of amplifying circuitry 400 can be the product of the beta of transistor $Q_1$ and the beta of transistor $Q_2$. Resistor $R_2$ 402 reduces the gain of amplifying circuitry 400 and can be used to set the gain to a desired value.

In another example where transistors $Q_1$ and $Q_2$ operate in the saturation region, amplifying circuitry 400 can acts as a switch. In this case, the magnitude of current $I_{VR}$ 122 depends on the resistance of resistor $R_1$ 404. As such, resistor $R_1$ 404 can set the maximum amount of current that amplifying circuitry 400 can conduct between terminals 111 and 113.

Controller 140 includes a dimming detection circuit 440, an input control circuit 430 and a drive signal generator 450. Dimming detection circuit 440 is coupled to receive voltage sense signal $U_{VS}$ 132 and current sense signal $U_{IS}$ 142. Dimming detection circuit 440 outputs an enable signal $U_{EN}$ 434, a leading edge signal $U_{LE}$ 436, a trailing edge signal $U_{TE}$ 438, an undervoltage signal $U_{UV}$ 432, and a zero crossing signal $U_{ZC}$ 442 in response to at least one of voltage sense signal $U_{VS}$ 132 and current sense signal $U_{IS}$ 142.

Enable signal $U_{EN}$ 434 indicates to input control circuit 430 whether bleeder circuit 120 should be enabled to conduct current or kept disabled. In one example, enable signal $U_{EN}$ 434 is a signal that can alternate between a first level and a second level, with the first level corresponding to bleeder circuit 120 being disabled and the second level corresponding to bleeder circuit 120 being enabled. Dimming detection circuit 440 can transition enable signal $U_{EN}$ 434 from the first level to the second level in response to at least one of voltage sense signal $U_{VS}$ 132 and current sense signal 142 indicating that bleeder circuit 120 should be enabled. Dimming detection circuit 440 can keep enable signal $U_{EN}$ 434 at the second level for a certain number of half-line cycles (e.g., 12 half-line cycles) after determining that bleeder circuit 120 should be enabled.

Zero crossing signal $U_{ZC}$ 442 indicates the portion of the half-line cycle that rectified voltage $V_{RCT}$ 107 is zero volts or close to zero volts. Zero crossing signal $U_{ZC}$ 442 may be a signal that alternates between two levels in response to voltage sense signal $U_{VS}$ 132 such that one of the levels corresponds to rectified voltage $V_{RCT}$ 107 being greater than a zero crossing threshold and the other level corresponds to rectified voltage $V_{RCT}$ 107 being less than the zero crossing threshold. In one example, the zero crossing threshold can be approximately one third of the peak voltage of line voltage $V_{AC}$ 105. In one example, dimming detection circuit 440 can determine that bleeder circuit 120 should be enabled and therefore, transition enable signal $U_{EN}$ 434 to the second level when zero crossing signal $U_{ZC}$ 442 indicates that the portion of the half-line cycle during which rectified voltage $V_{RCT}$ 107 is less than the zero crossing threshold has reached a dimming threshold (e.g., 20% of the half-line cycle).

Undervoltage signal $U_{UV}$ 432 indicates whether rectified voltage $V_{RCT}$ 107 is above or below an undervoltage threshold $V_{TH}$ (e.g., 40V). In the illustrated example, this may indicate whether or not input control circuit 430 is responsive to current sense signal $U_{IS}$ 142. In one example, input control circuit 430 may be responsive to current sense signal $U_{IS}$ 142 when undervoltage signal $U_{UV}$ 432 indicates that rectified voltage $V_{RCT}$ 107 is above the undervoltage threshold $V_{TH}$. Conversely, input control circuit 430 may be not responsive to current sense signal $U_{IS}$ 142 when undervoltage signal $U_{UV}$ 432 indicates that rectified voltage $V_{RCT}$ 107 is below the undervoltage threshold $V_{TH}$.

Leading edge signal $U_{LE}$ 436 indicates a leading edge in voltage sense signal $U_{VS}$ 132 (hence, in input voltage $V_{IN}$ 106) that may correspond to turning on of the triac of dimmer circuit 102 in a half-line cycle. Dimming detection circuit 440 can set leading edge signal $U_{LE}$ 436 to a logic high pulse in response to detecting a leading edge in voltage sense signal $U_{VS}$ 132. Leading edge signal $U_{LE}$ 436 may be set to a logic low level at other times. Trailing edge signal $U_{TE}$ 438 indicates a trailing edge in voltage sense signal $U_{VS}$ 132 (hence, in input voltage $V_{IN}$ 106) that may correspond to turning off of a trailing edge dimmer in a half line cycle. Dimming detection circuit 440 can set trailing edge signal $U_{TE}$ 438 to the logic high level in response to detecting a trailing edge in voltage sense signal $U_{VS}$ 132 and keeps it at that level until the end of the half-line cycle. Trailing edge signal $U_{TE}$ 438 may be set to the logic low level at other times. In addition, if a trailing edge in voltage sense signal $U_{VS}$ 132 is detected in M (e.g., eight) consecutive half-line cycles, dimming detection circuit 440 can latch trailing edge signal $U_{TE}$ 438 at the logic high level as long as controller 140 is on.

Additionally, dimming detection circuit 440 outputs a phase signal $U_{PH}$ 454 in response to at least one of voltage sense signal $U_{VS}$ 132 and current sense signal $U_{IS}$ 142. Phase signal $U_{PH}$ 454 represents a portion of a half-line cycle during which line voltage $V_{AC}$ 105 is provided to driver circuit 150, which may also be referred to as a conduction angle.

Input control circuit 430 is coupled to receive zero crossing signal $U_{ZC}$ 442, undervoltage signal $U_{UV}$ 432, leading edge signal $U_{TE}$ 436, trailing edge signal $U_{TE}$ 438, enable signal $U_{EN}$ 434 and current sense signal $U_{IS}$ 142. Input control circuit 430 is also coupled to terminal 113. When enable signal $U_{EN}$ 434 indicates that bleeder circuit 120 is enabled and conducting current, input control circuit 430 can adjust the control signal $U_C$ in response to at least one of zero crossing signal $U_{ZC}$ 442, undervoltage signal $U_{UV}$ 432, leading edge signal $U_{LE}$ 436, trailing edge signal $U_{TE}$ 438 and current sense signal $U_{IS}$ 142 and in turn, can vary current $I_{VR}$ 122 to control rectified current $I_{RCT}$ 112. In case a triac is used in dimmer circuit 102, this can ensure that enough current is drawn from dimmer circuit 102 to prevent the triac from turning off prematurely during a half-line cycle. In case a trailing edge dimmer is used in dimmer circuit 102, this can ensure that the voltage at the output of dimmer circuit 102 drops to zero volts after dimmer circuit 102 is disengaged.

Input control circuit 430 can adjust both the magnitude and the direction of the control signal $U_C$. For example, input control circuit 430 can increase the control signal $U_C$ by providing more current to output terminal 144 if more current needs to be drawn by the bleeder circuit 120 to maintain proper operation of dimmer circuit 102. However, if no current needs to be drawn by the bleeder circuit 120 to maintain proper operation of dimmer circuit 102, input control circuit 430 can remove current (i.e., the control signal $U_C$ becomes negative) from output terminal 144 such that voltage $V_{C1}$ 408 drops below the turn-on threshold and as a result, stop bleeder circuit 120 from conducting current.

As previously mentioned, input control circuit 430 can be either responsive or not responsive to current sense signal $U_{IS}$ 142. When responsive to current sense signal $U_{IS}$ 142, input control circuit 430 can adjust the control signal $U_C$ to keep the minimum value of rectified current $I_{RCT}$ 112 at one or more desired levels or above. This may help keep the triac current above the latching current for the latching period and above the holding current for the remainder of the half-line cycle and therefore, prevent the triac from misfiring. Input control circuit 430 can perform this by first comparing current sense signal $U_{IS}$ 142 with a reference representative of a desired level for rectified current $I_{RCT}$ 112. If current sense signal $U_{IS}$ 142 is below the reference, input control circuit 430 can adjust the control signal $U_C$ to reduce the difference between current sense signal $U_{IS}$ 142 and the reference. For example, if current sense signal $U_{IS}$ 142 drops below the reference, input control circuit 430 can increase rectified current $I_{RCT}$ 112 by providing more current to output terminal 144 to increase current $I_{VR}$ 122 and in turn, reduce the difference between current sense signal $U_{IS}$ 142 and the reference.

Conversely, when not responsive to current sense signal $U_{IS}$ 142, input control circuit 430 can provide a constant current to output terminal 144 to keep voltage $V_{C1}$ 408 above the turn-on threshold such that bleeder circuit 120 can act as a closed switch and conduct current. Some triacs may misbehave (e.g., may not remain turned on) when the current through the triac rises rapidly as the triac turns on. As mentioned above, input control circuit 430 can provide a constant current to output terminal 144 such that bleeder circuit 120 conducts current before the triac turns on. For example, input control circuit 430 can provide a constant current to output terminal 144 to keep voltage $V_{C1}$ 408 above the turn-on threshold and hence, bleeder circuit 120 conducting current while rectified voltage $V_{RCT}$ 107 is below the undervoltage threshold $V_{TH}$ during which the triac may be turned off. In this manner, input control circuit 430 can lower the rate of increase of the current (i.e., reduce the current spike) through the triac when the triac turns on and thus, prevent the triac from turning off prematurely. Drive signal generator 450 is coupled to receive a feedback signal $U_{FB}$ 452 representative of the output quantity of power conversion system 100 and phase signal $U_{PH}$ 454. Feedback signal $U_{FB}$ 452 can be generated inside controller 140 or can be received from external circuitry. Drive signal generator 450 outputs drive signal $U_{DR}$ 146 to control the energy transfer from the input to the output of driver circuit 150 such that the output quantity of power conversion system 100 is regulated at a desired level. Drive signal generator 450 can adjust drive signal $U_{DR}$ 146 in response to at least one of phase signal $U_{PH}$ 454 and feedback signal $U_{FB}$ 452 to control the energy transfer from the input to the output of driver circuit 150. For example, drive signal generator 450 can adjust drive signal $U_{DR}$ 146 to prevent the energy transfer from the input to the output of driver circuit 150 in response to phase signal $U_{PH}$ 454 indicating that the portion of the half-line cycle during which line voltage $V_{AC}$ 105 is provided to driver circuit 150 has reached a certain threshold (e.g., 30% of the half-line cycle), which may also be referred to as a deep dimming threshold. In this case, although driver circuit 150 is disabled and does not transfer energy from the input to the output of driver circuit 150, input control circuit 430 can continue to keep bleeder circuit 120 enabled and control rectified current $I_{RCT}$ 112.

FIG. 5 shows a table that includes a list of events detected by the controller of FIG. 1 and the corresponding response of the input control circuit of the controller. As shown, the first event corresponds to detection of dimming but without the type of dimmer being discerned. This can be referred to as an unknown dimming detection. In the depicted example, dimming can be detected in response to the portion of the half-line cycle during which rectified voltage $V_{RCT}$ 107 is below the zero crossing threshold being equal to or greater than the dimming threshold for K (e.g., eight) consecutive half-line cycles. In this case, dimming detection circuit 440 can set enable signal $U_{EN}$ 434 to the second level indicating that dimming has started and that both input control circuit 430 and bleeder circuit 120 should be enabled. Moreover, dimming detection circuit 440 can keep enable signal $U_{EN}$ 434 at the second level for a certain period of time (referred to as a bleeder enable window or a dimming window) after dimming has been detected. The bleeder enable window may be N (e.g., ten) consecutive half-line cycles.

Additionally, dimming detection circuit 440 can set enable signal $U_{EN}$ 434 to the second level, thereby enabling input control circuit 430 (hence, enabling bleeder circuit 120 to conduct current) when there is a pulse in leading edge signal $U_{LE}$ 436 indicating the detection of a leading edge in voltage sense signal $U_{VS}$ 132 or when there is a pulse in trailing edge signal $U_{TE}$ 438 indicating the detection of a trailing edge in voltage sense signal $U_{VS}$ 132. In these cases, dimming detection circuit 440 can set enable signal $U_{EN}$ 434 to the second level as soon as one of leading edge signal $U_{LE}$ 436 and trailing edge signal $U_{TE}$ 438 transitions to a logic high pulse. Further, similar to the case in which dimming is detected, dimming detection circuit 440 can keep enable signal $U_{EN}$ 434 at the second level for the duration of a bleeder enable window. In some implementations, once enabled in response to one of dimming, a trailing edge in voltage sense signal $U_{VS}$ 132, and a leading edge in voltage sense signal $U_{VS}$ 132, both input control circuit 430 and bleeder circuit 120 are kept enabled for a minimum number of half-line cycles (e.g., ten half line cycles).

If at least one of a trailing edge in voltage sense signal $U_{VS}$ 132, a leading edge in voltage sense signal $U_{VS}$ 132, and dimming is again detected within the existing bleeder enable window, dimming detection circuit 440 starts a new bleeder enable window. In other words, the existing bleeder enable window is extended by P half-line cycles during which enable signal $U_{EN}$ 434 remains at the second level. P may be equal to the length of a bleeder enable window in terms of half-line cycles (e.g., N) minus the number of half-line cycles between the start of a new bleeder enable window and the end of the existing bleeder enable window.

In operation, when the first event occurs, for the following bleeder enable window, input control circuit 430 operates in a way such that when undervoltage signal $U_{UV}$ 432 indicates that rectified voltage $V_{RCT}$ 107 is less than undervoltage threshold $V_{TH}$, input control circuit 430 sets the control signal $U_C$ to a first current value, thereby providing a constant current to output terminal 144. When undervoltage signal $U_{UV}$ 432 indicates that rectified voltage $V_{RCT}$ 107 is greater than the undervoltage threshold $V_{TH}$, input control circuit 430 adjusts the control signal $U_C$ to keep the minimum value of rectified current $I_{RCT}$ 112 at a low reference level $RF_L$ or above.

The second event corresponds to detection of a trailing edge dimmer. This can happen when a trailing edge in rectified voltage $V_{RCT}$ 107 is detected in M (e.g., eight) consecutive half-line cycles. In response to this event, so long as controller 140 remains on, input control circuit 430 operates in a way such that when undervoltage signal $U_{UV}$ 432 indicates that rectified voltage $V_{RCT}$ 107 is less than undervoltage threshold $V_{TH}$, input control circuit 430 sets the control signal $U_C$ to the first current value, thereby providing a constant current to output terminal 144. When undervoltage signal $U_{UV}$ 432 indicates that rectified voltage $V_{RCT}$ 107 is greater than undervoltage threshold $V_{TH}$, input control circuit 430 adjusts the control signal $U_C$ to keep the minimum value of rectified current $I_{RCT}$ 112 at the low reference level $RF_L$ or above.

The third event corresponds to detection of deep dimming. This happens when dimming is detected and phase signal $U_{PH}$ 454 indicates that the portion of the half-line cycle during which line voltage $V_{AC}$ 105 is provided to driver circuit 150 has reached the deep dimming threshold. In response to this event, input control circuit 430 operates in the same way as it does in response to the first event but drive signal generator 540 adjusts drive signal $U_{DR}$ 146 to prevent the energy transfer from the input to the output of driver circuit 150. This is because when the portion of the half-line cycle during which line voltage $V_{AC}$ 105 is provided to driver circuit 150 reaches a certain level, output current $I_{OUT}$ 154 becomes very sensitive to transient changes at the input of driver circuit 150 and hence, can cause light output by load 160 to fluctuate from one half-line cycle to another. Controller 140 can eliminate these fluctuations by disabling the energy transfer from the input to the output of driver circuit 150, in effect shutting off the light output by load 160. However, controller 140 continues to operate input control circuit 430 according to the first event such that if the portion of the half-line cycle during which line voltage $V_{AC}$ 105 is provided to driver circuit 150 later reverts to a level above the deep dimming threshold, dimmer circuit 102 can continue to function as desired.

The fourth event corresponds to detection of a leading edge dimmer. This can happen when a leading edge in voltage sense signal $U_{VS}$ 132 is detected in a half-line cycle. In response to this event, input control circuit 430 first sets the control signal $U_C$ to a second current value for a first period after the leading edge is detected, then adjusts the control signal $U_C$ to keep the minimum value of rectified current $I_{RCT}$ 112 at a high level reference $RF_H$ (e.g., three times the low level reference $RF_L$) or above for a second period and after that, adjusts the control signal $U_C$ to keep the minimum value of rectified current $I_{RCT}$ 112 at the low reference $RF_L$ or above. If a leading edge was detected within at least one of (N−1) half-cycles prior to the presently occurring half-line cycle, input control circuit 430 sets the control signal $U_C$ to the second current value as soon as undervoltage signal $U_{UV}$ 432 indicates that rectified voltage $V_{RCT}$ 107 has risen above undervoltage threshold $V_{TH}$. In the illustrated example, the second current value is at least three times the first current value.

FIG. 6 illustrates an example circuit diagram for the input control circuit shown in FIG. 4. Input control circuit 430 includes an amplifier 600, a logic and timing circuit 610, a current boost circuit 630 and a logic gate 640. Logic and timing circuit 610 is coupled to receive undervoltage signal $U_{UV}$ 432, leading edge signal $U_{LE}$ 436, trailing edge signal $U_{TE}$ 438, enable signal $U_{EN}$ 434 and zero crossing signal $U_{ZC}$ 442. Logic and timing circuit 610 is further coupled to output a first select signal $U_{SE1}$ 612, a second select signal $U_{SE2}$ 614, and a boost enable signal $U_{BEN}$ 616.

Amplifier 600 is a transconductance amplifier that can source (provide) current to output terminal 144 or sink (remove) current from output terminal 144. Amplifier 600 can be enabled in response to enable signal $U_{EN}$ 434 indicating that bleeder circuit 120 should be enabled. When enabled, amplifier 600 can adjust the control signal $U_C$ to control rectified current $I_{RCT}$ 112. For example, when dimming signal $U_{EN}$ 434 is at the second level, amplifier 600 can adjust the control signal $U_C$ to keep the minimum value of rectified current $I_{RCT}$ 112 at the low reference level $RF_L$ or above so long as undervoltage signal $U_{UV}$ 432 indicates that rectified voltage $V_{RCT}$ 107 is above the undervoltage threshold $V_{TH}$. Amplifier 600 has two input terminals: a negative input terminal represented by '−' and a positive input terminal represented by '+'. The positive input terminal of amplifier 600 is coupled to a first switch S1 602 that can be toggled in response to first select signal $U_{SE1}$ 612 to set the signal at the positive input terminal to one of the low reference level $RF_L$ and the high reference level $RF_H$. The negative terminal of amplifier 600 is coupled to a second switch S2 604 that can be toggled in response to second select signal $U_{SE2}$ 614 to set the signal at the negative input terminal to one of current sense signal $U_{IS}$ 142 and the ground reference.

As an example, first select signal $U_{SE1}$ 612 may be a signal that alternates between two levels in response to one or more signals that are received by logic and timing circuit 610. One of the levels may correspond to first switch S1 602 being in a position such that the signal at the positive input terminal is set to the low reference $RF_L$ and the other level may correspond to first switch $S_1$ 602 being in a position such that the signal at the positive input terminal is set to the high reference level $RF_H$. For example, in response to leading edge signal $U_{LE}$ 436 indicating the detection of a leading edge in voltage sense signal $U_{VS}$ 132, logic and timing circuit 610 can set first select signal $U_{SE1}$ 612 to a level such that first switch S1 602 is put in a position to set the signal at the positive input terminal to the high reference level $RF_H$.

Similarly, second select signal $U_{SE2}$ 614 may be a signal that alternates between two levels in response to one or more signals that are received by logic and timing circuit 610. One of the levels may correspond to second switch $S_2$ 604 being in a position such that the signal at the negative input terminal is set to current sense signal $U_{IS}$ 142 and the other level may correspond to second switch $S_2$ 604 being in a position such that the signal at the negative input terminal is set to the ground reference. For example, in response to enable signal $U_{EN}$ 434 indicating that bleeder circuit 120 should be enabled and undervoltage signal $U_{UV}$ 432 indicating that rectified voltage $V_{RCT}$ 107 is above the undervoltage threshold, logic and timing circuit 610 can set second select signal $U_{SE2}$ 614 to a level such that second switch $S_1$ 604 is put in a position to set the signal at the negative input terminal to current sense signal $U_{IS}$ 142.

In operation, when the signal at the negative input terminal is set to the ground reference, amplifier 600 is not responsive to current sense signal $U_{IS}$ 142. In this case, amplifier 600 provides a fixed current of the first current value to output terminal 144. When the signal at the negative input terminal is set to current sense signal $U_{IS}$ 142, amplifier 600 becomes responsive to current sense signal $U_{IS}$ 142. In this case, amplifier 600 can adjust the control signal $U_C$ to keep the minimum value of $I_{RCT}$ 112 at a level that is equal to or greater than the signal at the positive input terminal. For example, if the signal at the positive input terminal is set to the low reference $RF_L$, amplifier 600 can adjust the control signal $U_C$ to keep the minimum value of $I_{RCT}$ 112 at the low reference $RF_L$ or above. Similarly, if the signal at the positive input terminal is set to the low reference $RF_H$, amplifier 600 can adjust the control signal $U_C$ to keep the minimum value of $I_{RCT}$ 112 at the high reference $RF_H$ or above.

Input control circuit 430 may also include a slope detection circuit 620 which is optional. Slope detection circuit 620 receives current sense signal $U_{IS}$ 142 and outputs a slope detect signal $U_{SD}$ 622. Slope detect signal $U_{SD}$ 622 indicates that the magnitude of slope of current sense signal $U_{IS}$ 142 (hence, the slope of rectified current $I_{RCT}$ 112) has reached a certain level, also referred to as a slope threshold. For example, slope detect signal $U_{SD}$ 622 may be a signal that alternates between two levels in response to current sense signal $U_{IS}$ 142. One of the levels may indicate that the magnitude of slope of current sense signal $U_{IS}$ 142 is equal to or greater than the slope threshold and the other level may indicate that the magnitude of slope of current sense signal $U_{IS}$ 142 is less than the slope threshold.

Current boost circuit 630 includes a current source 632 that can provide a constant boost current $I_B$ and a third switch $S_3$ 634 that is coupled to receive the signal at the output of logic gate 640. Current source 632 is coupled to output terminal 144 with third switch $S_3$ 634 such that when third switch $S_3$ 634 is closed (also referred to as being ON or being in an ON state), current source 632 can provide the boost current $I_B$ to output terminal 144 and when third switch 634 is open (also referred to as being OFF or being in an OFF state), current source 632 is prevented from providing the boost current $I_B$ to output terminal 144. Third switch $S_3$ 634 is coupled to switch between the ON state and the OFF state in response to the signal at the output of logic gate 640.

Logic gate 640 is coupled to receive boost enable signal $U_{BEN}$ 616 and slope detect signal $U_{SD}$ 622. Boost enable signal $U_{BEN}$ 616 may be a signal that alternates between two levels in response to one or more of the signals that are received by logic and timing circuit 610. One of the levels may indicate that additional current needs to be provided to output terminal 144 and the other level may indicate that no additional current is needed. For example, in response to leading edge signal $U_{LE}$ 438 indicating that a leading edge in voltage sense signal $U_{VS}$ 132 is detected, logic and timing circuit 610 can set boost enable signal $U_{BEN}$ 616 to the level that indicates that additional current needs to be provided to output terminal 144. In operation, when slope detect signal $U_{SD}$ 622 indicates that the magnitude of slope of current sense signal $U_{IS}$ 142 has reached the slope threshold and/or boost enable signal $U_{BEN}$ 616 indicates that additional current needs to be provided to output terminal 144, logic gate 640 sets the signal at its output to a level such that third switch $S_3$ 634 is closed and current source 632 provides the boost current $I_B$ to output terminal 144. In one example, logic gate 640 is a two-input OR gate and the signal at the output of logic gate 640 can alternate between a logic low level and a logic high level in response to at least one of boost enable signal $U_{BEN}$ 616 and slope detect signal $U_{SD}$ 622.

Figure 7A:
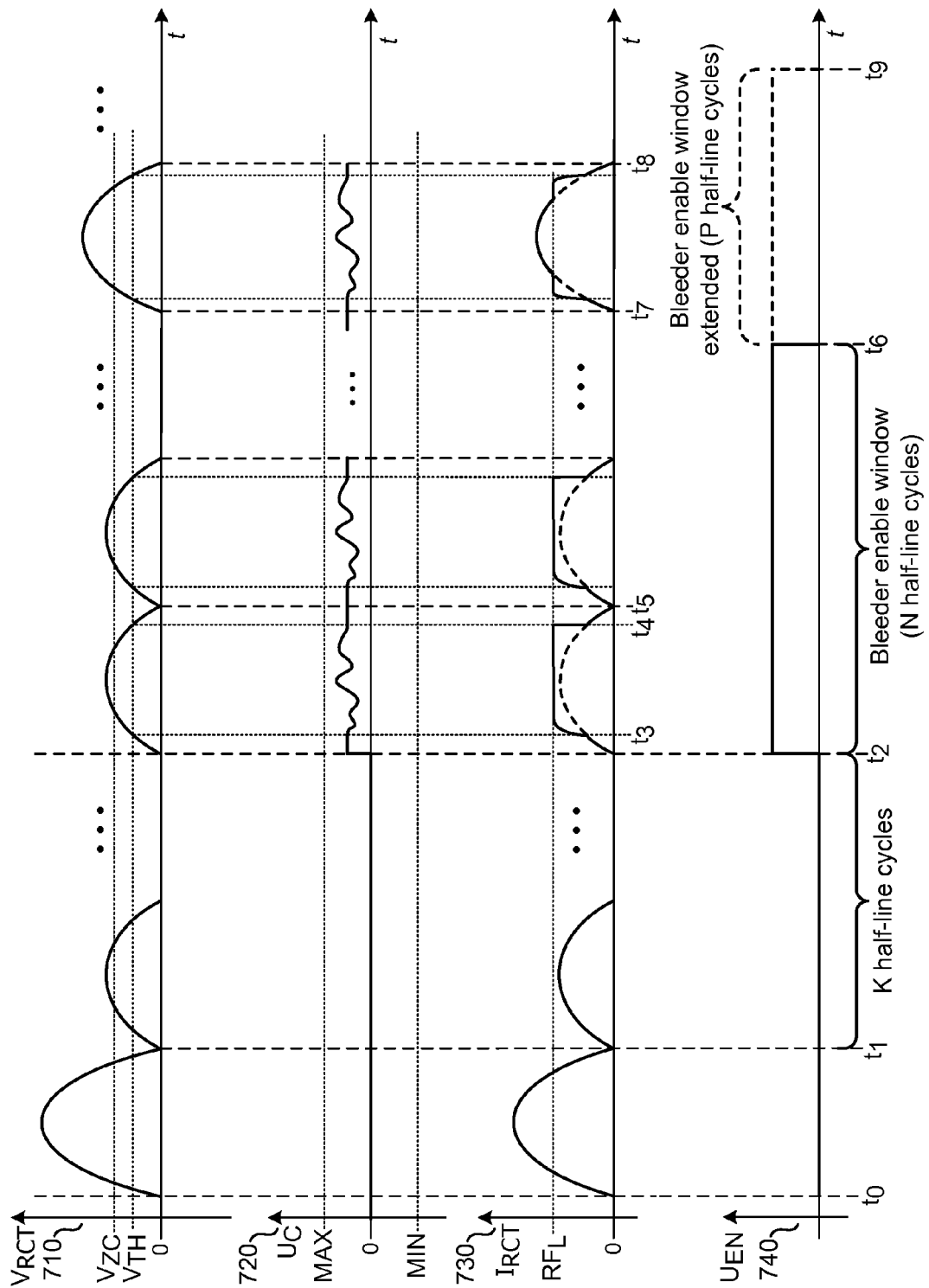
FIG. 7A shows several example voltage and current waveforms illustrating the operation of the input control circuit of FIG. 4 in response to detection of the first event in the table shown in FIG. 5, in accordance with an example of the disclosure.

FIG. 7A shows several example voltage and current waveforms illustrating the operation of input control circuit of FIG. 4 in response to detection of the first event in the table shown in FIG. 5. Waveform 710 is representative of rectified voltage $V_{RCT}$ 107, waveform 720 is representative of the control signal $U_C$, waveform 730 is representative of rectified current $I_{RCT}$ 112, and waveform 740 is representative of enable signal $U_{EN}$ 434. Between time $t_0$ and $t_1$, the portion of the half-line cycle during which waveform 710 is less than the zero crossing threshold $V_{ZC}$ is less than the dimming threshold. Waveform 740 is at the first level indicating that bleeder circuit 120 should be kept disabled. Waveform 720 is zero amperes as input control circuit 430 is disabled and not adjusting the control signal $U_C$. Since controller 140 provides PFC, waveform 730 is proportional to waveform 710.

For K half-line cycles between time t1 and t2, the portion of the half-line cycle during which waveform 710 is less than the zero crossing threshold $V_{ZC}$ is equal to or above the dimming threshold. Input control circuit 430 is not adjusting the control signal $U_C$, therefore waveform 720 is zero amperes and waveform 730 continues to be proportional to waveform 710. Starting at time $t_2$, waveform 740 transitions to the second level indicating that bleeder circuit 120 should be enabled. During the bleeder enable window that started at time $t_2$, input control circuit 430 operates according to the first event in the table of FIG. 5 as explained above. For example, between time $t_2$ and $t_5$, when waveform 710 is less than the undervoltage threshold $V_{TH}$, logic and timing circuit 610 sets first select signal $U_{SE1}$ 612 to put first switch $S_1$ 602 in a position such that the signal at the positive input terminal of amplifier 600 is set to the low reference level $RF_L$ and sets second select signal $USE_2$ 614 to put second switch $S_2$ 604 in a position such that the signal at the negative input terminal of amplifier 600 is set to the ground reference. In this case, amplifier 600 sets the control signal $U_C$ to the first current value and hence, provides a current of the first current value to output terminal 144 such that bleeder circuit 120 acts a closed switch and conducts current. As such, waveform 720 is at a level corresponding to the first current value. When amplifier 600 provides a current of the first current value, transistors $Q_1$ and $Q_2$ of amplifying circuitry 400 may operate in the saturation region. In this case, the current conducted by variable current circuit 120 is determined by the resistance of resistor $R_1$ 404. In other words, current $I_{VR}$ 122 becomes proportional to rectified voltage $V_{RCT}$ 107. Because controller 140 is providing PFC, the current into driver circuit 150 is also proportional to rectified voltage $V_{RCT}$ 107. Thus, rectified current $I_{RCT}$ 112, which is the sum of current $I_{VR}$ 122 and the current into driver circuit 150, is proportional to rectified voltage $V_{RCT}$ 107 as illustrated by waveform 710 between time $t_2$ and $t_3$ and between time $t_4$ and $t_5$.

When waveform 710 is greater than the undervoltage threshold $V_{TH}$ such as between time $t_3$ and $t_4$, logic and timing circuit 610 sets first select signal $U_{SE1}$ 612 to put first switch $S_1$ 602 in a position such that the signal at the positive input terminal of amplifier 600 is kept at the low reference level $RF_L$ but sets second select signal $U_{SE2}$ 614 to put second switch $S_2$ 604 in a position such that the signal at the negative input terminal of amplifier 600 is set to current sense signal $U_{IS}$ 142. In this case, amplifier 600 controls current $I_{VR}$ 122 by adjusting the control signal $U_C$ such that the minimum value of rectified current $I_{RCT}$ 112 is kept at the low reference level $RF_L$ or above as illustrated by the solid line in waveform 730. As further shown by waveform 720, amplifier 600 adjusts the control signal $U_C$ between a level MAX and a level MIN. The level MAX is a positive level and corresponds to maximum value of a current that amplifier 600 can provide to output terminal 144 whereas the level MIN is a negative level whose absolute value corresponds to the maximum value of a current that amplifier 600 can remove from output terminal 144. If amplifier 600 did not adjust the control signal $U_C$, waveform 730 would be proportional to waveform 710 and remain below the low reference level $RF_L$ as depicted by the dashed line in waveform 730.

During the bleeder enable window between time t2 and time t6, the portion of the half-line cycle during which waveform 710 is less than the zero crossing threshold $V_{ZC}$ remains equal to or above the dimming threshold for K consecutive half-line cycles. In other words, dimming is again detected within the existing bleeder enable window. Therefore, the existing bleeder enable window is extended by P half-line cycles from time $t_6$ until time $t_9$ during which waveform 740 remains at the second level. Input control circuit 430 continues to operate in the same way as it did between time $t_2$ and $t_6$ as for example can be seen by waveform 730 between time $t_7$ and $t_8$. Waveform 730 between time $t_7$ and $t_8$ differs from waveform 730 between time $t_2$ and $t_5$ such that a portion of waveform 730 appears to be proportional to waveform 710 and above the low reference level $RF_L$ while waveform 710 is above the undervoltage threshold $V_{TH}$. This is because waveform 710 has greater amplitude between time $t_7$ and $t_8$ such that the portion of waveform 730 is above the low reference level $RF_L$ without bleeder circuit 120 conducting any additional current between terminals 111 and 113.

Figure 7B:
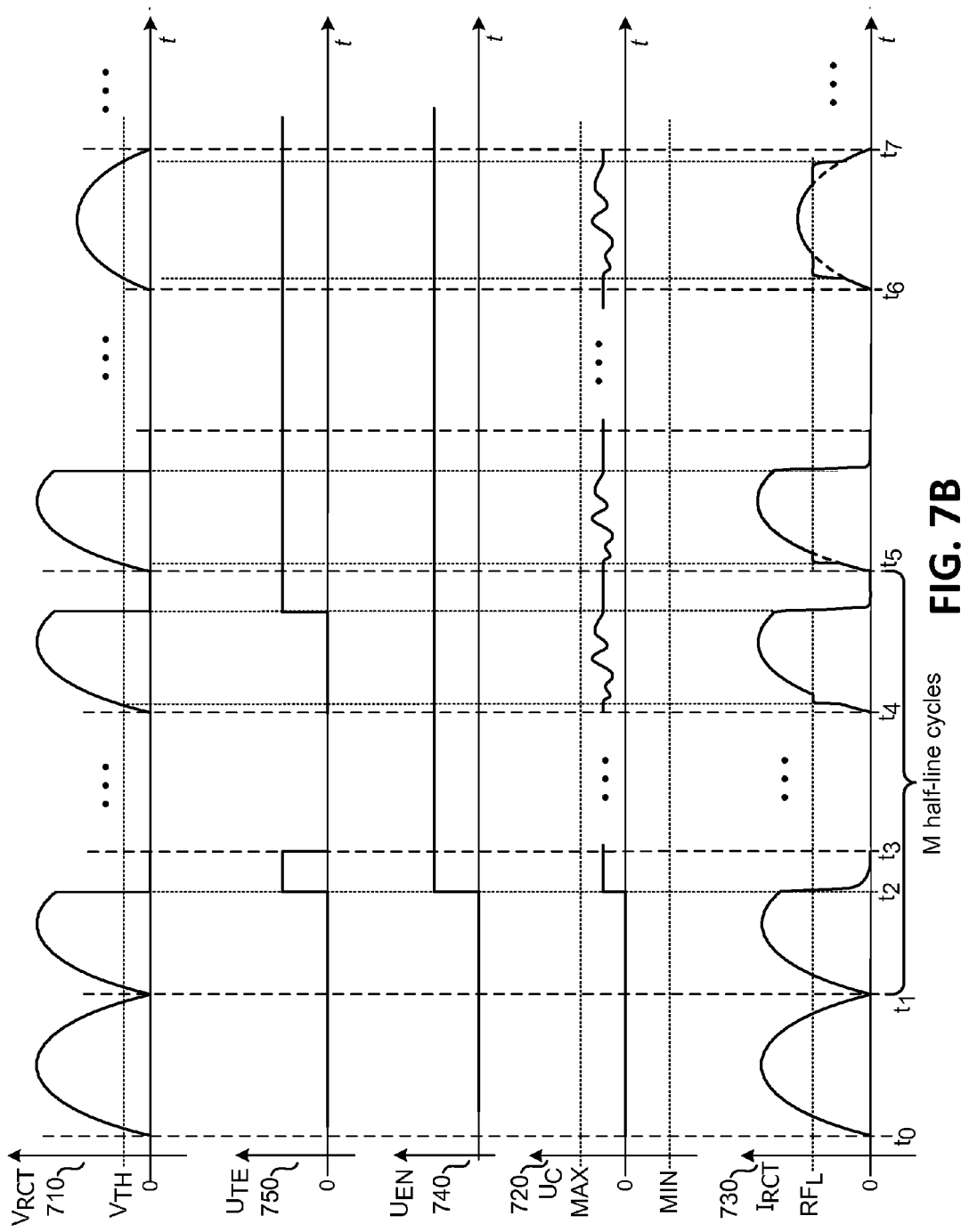
FIG. 7B shows several example voltage and current waveforms illustrating the operation of the input control circuit of FIG. 4 in response to detection of the second event in the table shown in FIG. 5, in accordance with an example of the disclosure.

FIG. 7B shows several example voltage and current waveforms illustrating the operation of input control circuit of FIG. 4 in response to detection of the second event in the table shown in FIG. 5. Waveform 710 is representative of rectified voltage $V_{RCT}$ 107, waveform 720 is representative of the control signal $U_C$, waveform 730 is representative of rectified current $I_{RCT}$ 112, waveform 740 is representative of enable signal $U_{EN}$ 434, and waveform 750 is representative of trailing edge signal $U_{TE}$ 438. Between time $t_0$ and $t_1$, the portion of the half-line cycle during which waveform 710 is less than the zero crossing threshold $V_{ZC}$ is less the dimming threshold and there is no leading or trailing edge in waveform 710. Waveform 740 is at the first level indicating that bleeder circuit 120 should be kept disabled. Waveform 750 is at the logic low level indicating that no trailing edge has been detected. Waveform 720 is zero amperes as input control circuit 430 is disabled and not adjusting the control signal. Since driver circuit 150 performs power factor correction, waveform 730 is proportional to waveform 710.

For M half-line cycles between time $t_1$ and $t_3$, dimmer circuit 102 blocks line voltage $V_{AC}$ 105 from driver circuit 150 for a portion of the end of the half-line cycle and thus, there is a trailing edge in waveform 710 in each half-line cycle. Once the first trailing edge is detected at time $t_2$ as indicated by waveform 750 transitioning to the logic high level, waveform 740 transitions to the second level indicating that bleeder circuit 120 should be enabled. At time $t_3$, waveform 750 transitions back to the logic low level but waveform 740 stays at the second level. This continues for (M-1) half-line cycles with input control circuit 430 operating according to the first event in the table of FIG. 5. Since input control circuit 430 provides a current of the first current value to output terminal 144 and causes bleeder circuit 120 to conduct current when waveform 710 is below the undervoltage threshold $V_{TH}$ during this time period, waveform 710 can go down to zero volts after each trailing edge such as, for example, between time $t_2$ and $t_3$. At time $t_5$, the $M^{th}$ trailing edge in waveform 710 within M consecutive half-line cycles is detected as depicted by waveform 750 transitioning to the logic high level. From this point onwards, so long as controller 140 is on, waveform 750 stays at the logic high level and waveform 740 stays at the second level. As such, input control circuit 430 continues to operate according to the first event in the table of FIG. 5.

Figure 7C:
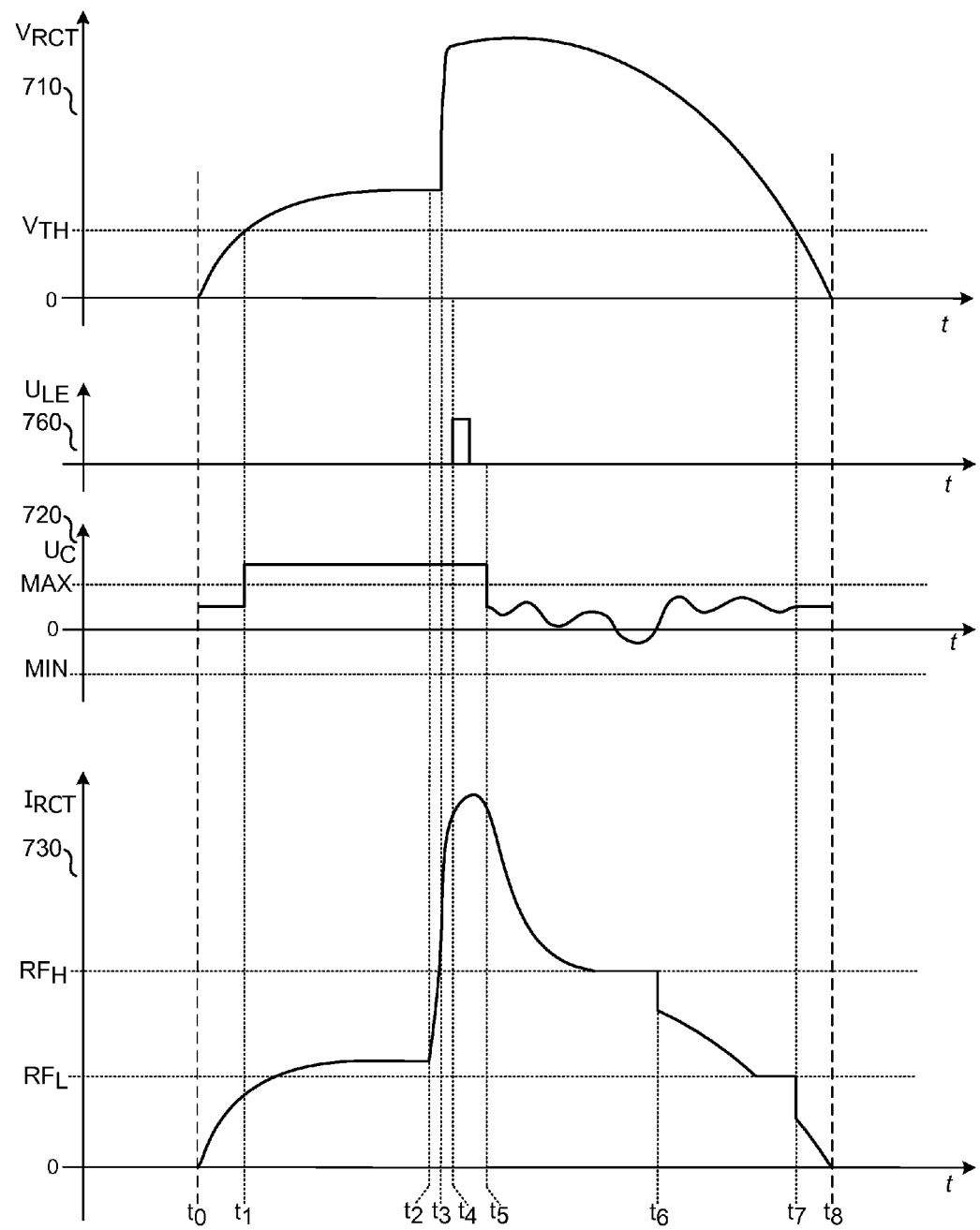
FIG. 7C shows several example voltage and current waveforms providing a detailed view of the operation of input control circuit of FIG. 4 in response to detection of a leading edge in a half-line cycle, in accordance with an example of the disclosure.

FIG. 7C shows several example voltage and current waveforms providing a detailed view of the operation of input control circuit of FIG. 4 in response to detection of a leading edge in a half-line cycle. Waveform 710 is representative of one half-line cycle of rectified voltage $V_{RCT}$ 107, waveform 720 is representative of one half-line cycle of the control signal $U_C$, waveform 730 is representative of one half-line cycle of rectified current $I_{RCT}$ 112 and waveform 760 is representative of one half-line cycle of leading edge signal $U_{LE}$ 436. Time period between time to and $t_2$ represents a portion of the half-line cycle where the triac is turned off and blocking line voltage $V_{AC}$ 105 from driver circuit 150. In an ideal case, waveform 710 is zero volts during this time, however, the triac may be leaky and can still conduct current despite being disengaged, which can cause rectified voltage $V_{RCT}$ 107 to increase as illustrated by waveform 710. Since controller 140 provides power factor correction, waveform 730 is proportional to waveform 710. At time $t_2$, the triac is engaged and unblocks line voltage $V_{AC}$ 105 from driver circuit 150 causing waveform 730 to rise. Waveform 710 also starts rising but later at time $t_3$ because capacitive components at the input of driver circuit 150 are charged by rectified current $I_{RCT}$ 112 and that introduces delay.

Leading edge in waveform 710 is detected at time $t_4$ as dimming detection circuit 440 sets leading edge signal $U_{LE}$ 436 to the logic high pulse as shown by waveform 760. Amplifier 600 provides a current of the second current value to output terminal 144 for the first period from time $t_4$ until time $t_5$. Then, for the second period between time $t_5$ and $t_6$, as waveform 720 depicts, amplifier 600 adjusts the control signal $U_C$ between the level MAX and the level MIN such that the minimum value of waveform 730 is kept at the high reference level $RF_H$ or above. From time $t_6$ and until waveform 710 reaches the undervoltage threshold $V_{TH}$ at time $t_7$, amplifier 600 adjusts the control signal $U_C$ between the level MAX and the level MIN such that the minimum value of waveform 730 is kept at the low reference level $RF_L$ or above. Between time $t_5$ and $t_7$, if slope detect signal $U_{SD}$ 622 indicates that the rate of drop of waveform 730 has reached the slope threshold, logic gate 640 sets the signal at its output to a level such that third switch $S_3$ 634 is closed and current source 632 provides the boost current $I_B$ to output terminal 144. This in turn can slow down the rate of drop of waveform 730, thereby preventing waveform 730 from dipping below reference levels $RF_L$ and $RF_H$. Between time $t_7$ and $t_8$, waveform 710 is less than the undervoltage threshold $V_{TH}$ and amplifier 600 provides a current of the first current value to output terminal 144. As such, waveform 730 is proportional to waveform 710 between time $t_7$ and $t_8$.

In the illustrated example, waveform 720 shows that input control circuit 430 provides a current of the first current value to output terminal 144 between time $t_0$ and $t_1$ and a current of the second current value from time $t_1$ until the leading edge is detected at time $t_4$. Input control circuit 430 operates in this way if a leading edge was also detected in at least one of (N-1) half-line cycles prior to the half-line cycle between time $t_0$ and $t_8$. Otherwise, for example, input control circuit 430 can adjust the control signal $U_C$ to keep the minimum value of waveform 730 at the low reference level $RF_L$ or above, such as, between time $t_1$ and $t_4$. In another example, enable signal $U_{EN}$ 434 may be at the first level between time $t_0$ and $t_4$ indicating that bleeder circuit 120 should be kept disabled and as a result, waveform 720 may be zero amperes during this time.

Figure 7D:
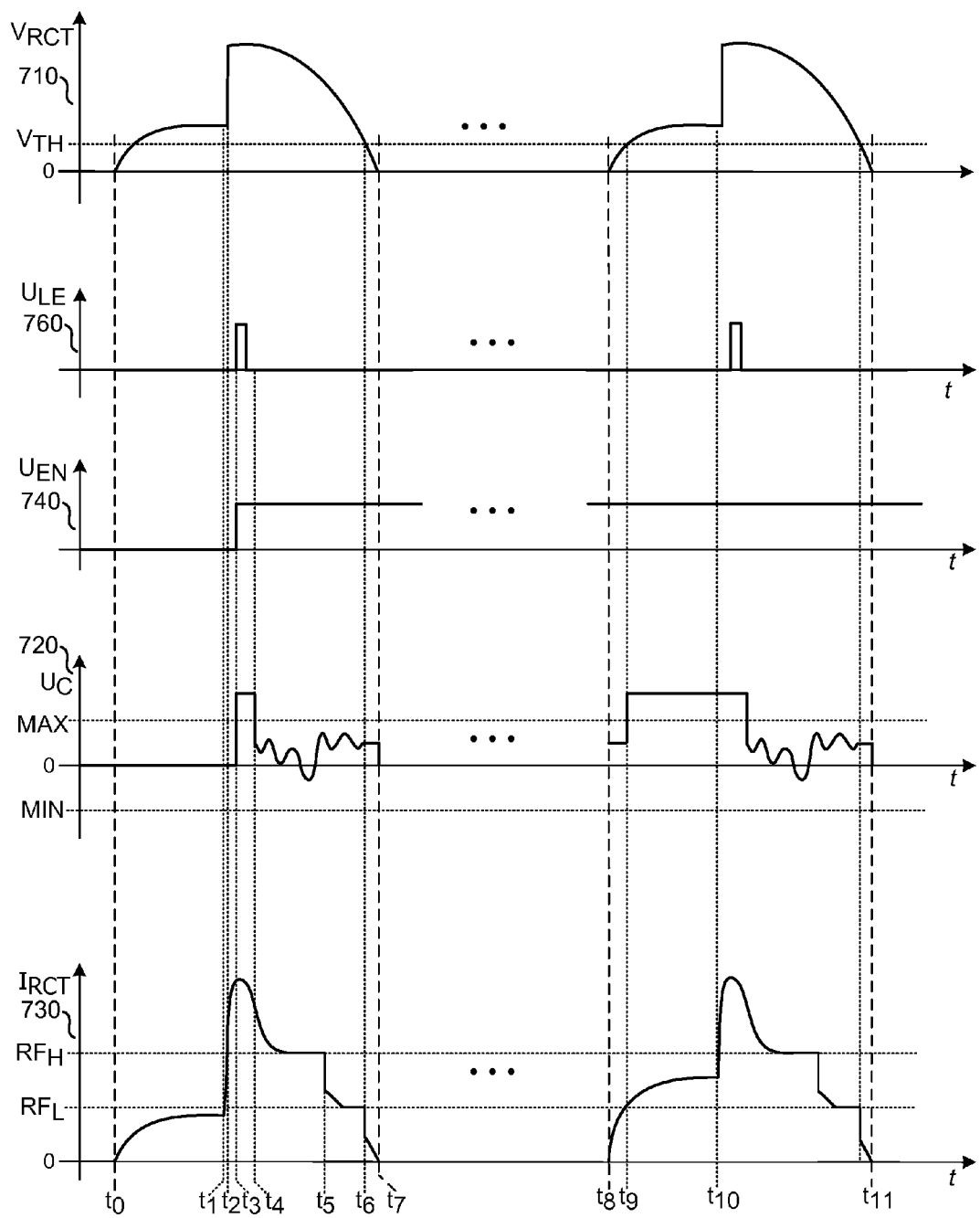
FIG. 7D shows example voltage and current waveforms illustrating the operation of input control circuit of FIG. 4 over several half-line cycles in response to detection of the fourth event in the table shown in FIG. 5, in accordance with an example of the disclosure.

FIG. 7D shows example voltage and current waveforms illustrating the operation of input control circuit of FIG. 4 over several half-line cycles in response to detection of the fourth event in the table shown in FIG. 5. Waveform 710 is representative of rectified voltage $V_{RCT}$ 107, waveform 720 is representative of the control signal $U_C$, waveform 730 is representative of rectified current $I_{RCT}$ 112, waveform 740 is representative of enable signal $U_{EN}$ 434, and waveform 760 is representative of leading edge signal $U_{LE}$ 436. In the half-line cycle between time $t_0$ and $t_7$, waveform 740 is at the first level until a leading edge is detected in waveform 710 at time $t_3$ as indicated by a logic high pulse in waveform 760. Until time $t_3$, input control circuit 430 is disabled and waveform 720 is zero amperes. Time period between time $t_0$ and $t_1$ represents a portion of the half-line cycle where the triac is disengaged but because the triac is leaky, rectified voltage $V_{RCT}$ 107 increases as shown by waveform 710. Since controller 140 provides power factor correction, waveform 730 is proportional to waveform 710.

At time $t_1$, the triac is engaged causing waveform 730 to increase. Waveform 710 also starts rising but later at time $t_2$. Once the leading edge is detected at time $t_3$, waveform 740 transitions to the second level indicating that bleeder circuit 120 should be enabled. For the first period between time $t_3$ and $t_4$, waveform 720 is at a level corresponding to the second current value indicating that amplifier 600 is providing a current of the second current value to output terminal 144. For the second period between time $t_4$ and $t_5$, as waveform 720 depicts, amplifier 600 adjusts the control signal $U_C$ between the level MAX and the level MIN such that the minimum value of waveform 730 is kept at the low reference level $RF_H$ or above. From time $t_5$ and until waveform 710 reaches undervoltage threshold $V_{TH}$ at time $t_6$, amplifier 600 adjusts the control signal $U_C$ between the level MAX and the level MIN such that the minimum value of waveform 730 is kept at the low reference level $RF_L$ or above. Between time $t_6$ and $t_7$, waveform 710 is less than undervoltage threshold $V_{TH}$ and waveform 720 is at a level corresponding to the first current value indicating that amplifier 600 is providing a current of the first current value to output terminal 144. Therefore, waveform 730 is proportional to waveform 710.

Time period between time $t_8$ and $t_{12}$ represents one of the (N−1)th half-line cycles after the half-line cycle between time $t_0$ and $t_7$. The operation of input control circuit 430 during this half-line cycle is different from its operation between time $t_0$ and $t_7$ in a number of ways. First, waveform 740 is at the second level for the entire half-line cycle. Therefore, from time $t_8$ until waveform 710 reaches undervoltage threshold $V_{TH}$ at time $t_9$, waveform 720 is at a level corresponding to the first current value indicating that amplifier 600 is providing a current of the first current value to output terminal 144. Moreover, since a leading edge in waveform 710 was detected in at least one of the (N−1) half-line cycles prior to this half-line cycle, waveform 720 transitions to a level corresponding to the second current value at time $t_9$ instead of a time point that corresponds to the detection of a leading edge in waveform 710. This means that amplifier 600 starts providing a current of the second current value to output terminal 144 before a leading edge in waveform 710 is detected. Another difference is that waveform 730 from time $t_8$ until the triac is engaged at time $t_{10}$ is greater in magnitude because bleeder circuit 120 is driven with a higher current and thus, conducting more current.

A first example of this disclosure include a controller (e.g. controller 140) for use in a power converter that includes a variable current circuit (e.g. 120) that is coupled to conduct a variable current between input terminals of the power converter. The controller may include a detection circuit (e.g. 440) and an input control circuit (e.g. 430). The detection circuit may be coupled to detect one or more input voltage events of an input voltage of the power converter in response to a voltage sense signal that is representative of the input voltage of the power converter. The input control circuit may be coupled to the detection circuit and may for coupling to the variable current circuit via a terminal of the controller to control a value of the variable current in response to the detection circuit. The input control circuit is configured to source a current signal through the terminal of the controller to the variable current circuit to adjust the value of the variable current in a first direction. The input the input control circuit is further configured to sink the current signal through the terminal of the controller from the variable current circuit to adjust the value of the variable current in a second direction opposite the first. A value of an input current at the input terminals of the power converter varies in response to the adjustment of the variable current.

The input control circuit may be coupled to receive a current sense signal representative of the input current and the input control circuit is configured to adjust the value of the variable current to maintain a minimum value of the input current in response to the current sense signal, in the first example.

The detection circuit may be configured to detect a first input voltage event that is an under-voltage event including when the voltage sense signal indicates that the input voltage is below an under-voltage threshold. The input control circuit provides a constant current signal through the terminal of the controller such that the variable current circuit continuously conducts the variable current in response to the detection of the first input voltage event.

Still referring to the first example, the input control circuit may provide the constant current signal in response to the detection of the first input voltage event independent of the current sense signal.

The minimum value of the input current may be greater than or equal to a holding current threshold of a dimmer circuit coupled to the input terminals of the power converter.

The detection circuit may be configured to detect a second input voltage event that is an unknown dimming detection event including when the voltage sense signal indicates that a portion of a half-line cycle of the input voltage that is provided to the input terminals of the power converter reaches a dimming threshold for at least a minimum number of half-line cycles of the input voltage. And in that case, the input control circuit may be enabled in response to the detection circuit detecting the second input voltage event. The input control circuit may be kept enabled for a minimum time period in response to the second input voltage event, once the input control circuit is enabled.

The minimum time period that the input control circuit is kept enabled may be extended for a second time period if the detection circuit detects the second input voltage event again when the input control circuit is enabled. The minimum time period may be a minimum number (e.g. 10) of consecutive half-line cycles of the input voltage.

In the first example, the detection circuit may be configured to detect a third input voltage event that is a leading-edge dimming detection event including when the voltage sense signal indicates that a dimmer circuit coupled to the input terminals of the power converter is a leading-edge dimmer. And in that case, the input control circuit is enabled in response to the detection circuit detecting the third input voltage event.

Once enabled in response to the third input voltage event, the input control circuit may be kept enabled for a minimum number of consecutive half-line cycles of the input voltage.

Or, once enable in response to the third input voltage event, the input control circuit controls the variable current such that the value of the variable current is a constant value to keep the input current greater than or equal to a first minimum value for a first time period. And in that case, the input control circuit controls the variable current to keep the input current greater than or equal to a second minimum value for a subsequent second time period. The first minimum value of the input current may be greater than the second minimum value of the input current.

The first minimum value of the input current may be greater than or equal to a latching current threshold of the dimmer circuit and the second minimum value may be greater than or equal to a holding current threshold of the dimmer circuit.

The detection circuit may be configured to detect a fourth input voltage event that is a trailing-edge dimming detection event including when the voltage sense signal indicates that a dimmer circuit coupled to the input terminals of the power converter is a trailing-edge dimmer. And in that case, the input control circuit is enabled in response to the detection circuit detecting the fourth input voltage event.

The detection circuit may be coupled to detect four or more input voltage events in response to an voltage sense signal and the four or more input voltage events include an under-voltage event, an unknown dimming detection event, a leading-edge dimming detection event, and a trailing-edge dimming detection event.

The detection circuit may be coupled to detect a presence of a trailing edge dimmer by detecting a trailing edge in the voltage sense signal for M consecutive half-line cycles of the input voltage and in response thereto, the input control circuit may be configured to control the variable current to maintain a minimum value of the input current at a first level.

The input control circuit may be further configured to source a first substantially constant current through the terminal to the control terminal of the variable current circuit when the voltage sense signal is below a threshold.

In the first example, the detection circuit may be coupled to detect a presence of a leading edge dimmer by detecting a leading edge in the voltage sense signal in a half-line cycle of the input voltage and in response to detection of the presence of the leading edge dimmer, the input control circuit may be configured to source a second substantially constant current for a first period, control the variable current to maintain the minimum value of the input current at a second level for a subsequent second period after the first period, and from thereon within a half-line cycle of the input voltage, control the variable current to maintain a minimum value of the input current at the first level.

The above description of illustrated examples of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A bleeder controller for controlling a magnitude of a variable current conducted by bleeder circuitry between input terminals of a device, wherein the magnitude of the variable current is controllable in response to a control signal, the bleeder controller comprising:
   a control signal output to be coupled to output the control signal to the bleeder circuitry;
   an input current sense input to be coupled to receive an input current sense signal representative of a current input into the input terminals of the device;
   an input voltage sense input to be coupled to receive an input voltage sense signal representative of a voltage across the input terminals of the device;
   a dimming detector to classify, based on at least one of the input current sense signal and the input voltage sense signal, a present half line cycle to the device as a leading-edge-dimmed half line cycle; and
   control signal circuitry to set the control signal that is output to the control signal output, the control signal circuitry comprising:
      timer circuitry to define:
         an initial time period after a leading edge of the leading-edge-dimmed half line cycle, and
         a subsequent time period after the initial time period, wherein the initial time period and the subsequent time period are both within the leading-edge-dimmed half line cycle; and
      one or more amplifiers to compare the input current sense signal with a first current threshold during the initial time period and with a second current threshold during the subsequent time period, wherein the second current threshold is lower than the first current threshold, and wherein the control signal circuitry sets the control signal in response to results of the comparisons to maintain the current input into the input terminals above the first current threshold during the initial time period and above the second current threshold during the subsequent time period.

2. The bleeder controller of claim 1, wherein the control signal circuitry is to enter a leading-edge-dimmed window in response to the classification, by the dimming detector, of the present half line cycle as leading-edge-dimmed.

3. The bleeder controller of claim 2, wherein, within the leading-edge-dimmed window, for input voltages greater than a voltage threshold and prior to a leading edge of each half line cycle, the control signal circuitry sets the control signal so that the current input into the input terminals remains above the first current threshold.

4. The bleeder controller of claim 3, wherein the leading-edge-dimmed window has a duration of a number N half line cycles, wherein the number N is 4 or more half line cycles.

5. The bleeder controller of claim 4, wherein the number N is 6 or more half line cycles.

6. The bleeder controller of claim 1, wherein the one or more amplifiers generate one or more control signals representative of a magnitude that the current input into the input terminals is below the respective of the first current threshold and the second current threshold.

7. The bleeder controller of claim 6, wherein the bleeder circuitry comprises a current amplifier, and wherein the one or more control signals are one or more currents.

8. The bleeder controller of claim 1, wherein the first current threshold is approximately three times the second current threshold.

9. A bleeder controller for controlling a magnitude of a variable current conducted by bleeder circuitry between input terminals of a device, wherein the magnitude of the variable current is controllable in response to a control signal, the bleeder controller comprising:
 a control signal output to be coupled to output the control signal to the bleeder circuitry;
 an input current sense input to be coupled to receive an input current sense signal representative of a current input into the input terminals of the device;
 an input voltage sense input to be coupled to receive an input voltage sense signal representative of an input voltage across the input terminals of the device;
 a dimming detector to classify, based on at least one of the input current sense signal and the input voltage sense signal, a half line cycle to the device as a trailing-edge-dimmed; and
 control signal circuitry to set the control signal, the control signal circuitry including a latch to latch the bleeder controller in a trailing-edge-dimming mode in response to a classification, by the dimming detector, of a number N consecutive half line cycles as trailing-edge-dimmed, wherein, in the trailing-edge-dimming mode, for input voltages greater than a voltage threshold, the control signal circuitry sets the control signal to maintain the current input into the input terminals above a current threshold.

10. The bleeder controller of claim 9, wherein:
 the device is to be coupled to a rectifier having an output, and
 when in the trailing-edge-dimming mode for input voltages less than the voltage threshold, the control signal circuitry sets the control signal to conduct a current of a sufficient magnitude to discharge the output of the rectifier within each trailing-edge-dimmed half line cycle.

11. The bleeder controller of claim 10, wherein the latch is to reset only after the input voltage across the input terminals of the device falls to zero.

12. The bleeder controller of one of claim 10, wherein the number N is 4 or more.

13. The bleeder controller of claim 10, wherein the number N is 6 or more.

14. The bleeder controller of claim 9, wherein the control signal circuitry further comprises comparator circuitry to compare the input current sense signal with a reference that represents the current threshold and output the control signal, wherein the control signal is representative of a magnitude that the current input into the input terminals is below the current threshold.

15. The bleeder controller of claim 14, wherein the bleeder circuitry comprises a current amplifier, and wherein the control signal is a current.

16. A bleeder controller for controlling the magnitude of a variable current conducted by bleeder circuitry between input terminals of a device, wherein the magnitude of the variable current is controllable in response to a control signal, the bleeder controller comprising:
 a control signal output to be coupled to output the control signal to the bleeder circuitry;
 an input current sense input to be coupled to receive an input current sense signal representative of a current input into the input terminals of the device;
 an input voltage sense input to be coupled to receive an input voltage sense signal representative of a voltage across the input terminals of the device;
 a dimming detector to classify, based on at least one of the input current sense signal and the input voltage sense signal, half line cycles to the device as dimmed; and
 control signal circuitry to set the control signal, the control signal circuitry to enter a dimming window in response to a classification, by the dimming detector, of a number K successive half line cycles as dimmed, wherein the dimming window has a duration of a number N half line cycles;
 wherein, within the dimming window for input voltages greater than a voltage threshold, the control signal circuitry sets the control signal to maintain the current input into the input terminals above a current threshold.

17. The bleeder controller of claim 16, wherein the number K is at least four (4) and the number N is at least four (4).

18. The bleeder controller of claim 16, wherein the number K is at least six (6) and the number N is at least six (6).

19. The bleeder controller claim 16, wherein the control signal circuitry is further to extend the dimming window by a number P half line cycles in response to classification, by the dimming detector, a half line cycle within the dimming window as dimmed.

20. The bleeder controller of claim 19, wherein the number P is at least 2.

21. The bleeder controller of claim 20, wherein the number P is at least 4.

* * * * *